United States Patent
Stauth et al.

(10) Patent No.: US 9,660,523 B2
(45) Date of Patent: May 23, 2017

(54) SYSTEM AND METHOD FOR REDUCING POWER LOSS IN SWITCHED-CAPACITOR POWER CONVERTERS

(71) Applicant: The Trustees of Dartmouth College, Hanover, NH (US)

(72) Inventors: Jason T. Stauth, Hanover, NH (US); Kapil Kesarwani, Lebanon, NH (US); Christopher Schaef, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 15/117,201

(22) PCT Filed: Feb. 6, 2015

(86) PCT No.: PCT/US2015/014868
§ 371 (c)(1),
(2) Date: Aug. 7, 2016

(87) PCT Pub. No.: WO2015/120306
PCT Pub. Date: Aug. 13, 2015

(65) Prior Publication Data
US 2016/0344287 A1    Nov. 24, 2016

Related U.S. Application Data

(60) Provisional application No. 61/937,293, filed on Feb. 7, 2014.

(51) Int. Cl.
*H02M 3/07* (2006.01)
*H02J 7/00* (2006.01)
*H02M 1/00* (2006.01)

(52) U.S. Cl.
CPC ............. *H02M 3/07* (2013.01); *H02J 7/0014* (2013.01); *H02M 2001/0058* (2013.01); *Y02B 70/1491* (2013.01)

(58) Field of Classification Search
CPC ...... H02J 7/0014; H02J 7/0019; H02J 7/0013; H02M 3/07; H02M 3/073; H02M 7/4826;
(Continued)

(56) References Cited

U.S. PATENT DOCUMENTS

| | | | | |
|---|---|---|---|---|
| 6,218,831 B1 * | 4/2001 | Fowler | ................... | G01C 17/28 324/228 |
| 7,049,791 B2 * | 5/2006 | Lin | ....................... | H02J 7/0016 320/116 |

(Continued)

FOREIGN PATENT DOCUMENTS

WO    WO 2012/074967    6/2012

OTHER PUBLICATIONS

H. Le, S. R. Sanders, E. Alon, "Design Techniques for Fully Integrated Switched-Capacitor DC-DC converters," IEEE J. Solid-State Circuits, 2011, vol. 46, No. 9, pp. 2120-2131.
(Continued)

*Primary Examiner* — Thomas J Hiltunen
(74) *Attorney, Agent, or Firm* — Lathrop & Gage LLP

(57) ABSTRACT

A system and method allows for controlling a resonant switched-mode converter to provide a variable conversion ratio. The system and method operates to control the switching devices such that the impedance of the switched-mode converter is set to a plurality of configurations for a plurality of time intervals. The system and method may further include off-time modulation techniques for varying or maintaining the overall switching period of the switched-mode converter.

20 Claims, 16 Drawing Sheets

(58) Field of Classification Search
CPC . H02M 2007/4815; H02M 2007/4811; H02M 1/4241
See application file for complete search history.

(56) References Cited

U.S. PATENT DOCUMENTS

| | | | |
|---|---|---|---|
| 7,612,603 B1 | 11/2009 | Petricek et al. | |
| 8,212,537 B2* | 7/2012 | Carpenter | H02M 3/158 323/222 |
| 8,384,245 B2 | 2/2013 | Stauth et al. | |
| 8,390,147 B2 | 3/2013 | Stauth et al. | |
| 8,466,657 B2* | 6/2013 | Buono | H02J 7/0019 307/41 |
| 9,203,121 B2* | 12/2015 | Liu | H02J 7/0016 |
| 9,484,799 B2* | 11/2016 | Zhang | H02M 3/158 |
| 2004/0141345 A1 | 7/2004 | Cheng et al. | |
| 2006/0119390 A1* | 6/2006 | Sutardja | G06F 1/26 326/62 |
| 2007/0296383 A1* | 12/2007 | Xu | H02M 1/14 323/282 |
| 2008/0239772 A1 | 10/2008 | Oraw et al. | |
| 2010/0066341 A1 | 3/2010 | Watanabe et al. | |
| 2011/0018511 A1 | 1/2011 | Carpenter et al. | |
| 2011/0141779 A1* | 6/2011 | Joseph | H02M 7/487 363/95 |
| 2012/0154013 A1 | 6/2012 | Mera et al. | |
| 2013/0021011 A1 | 1/2013 | Okuda et al. | |
| 2013/0320914 A1* | 12/2013 | Li | H02J 7/0014 320/103 |
| 2014/0146587 A1* | 5/2014 | Voronin | H02M 3/158 363/131 |
| 2016/0020693 A1* | 1/2016 | Ribarich | H02M 3/158 363/60 |
| 2016/0352218 A1* | 12/2016 | Stauth | H02M 1/08 |

OTHER PUBLICATIONS

K. Kesarwani, R. Sangwan, and J.T. Stauth, "Resonant Switched-Capacitor Converters for Chip-Scale Power Delivery: Modeling and Design," IEEE Workshop on Control and Modeling for Power Electronics (COMPEL), 2013.

International Preliminary Report on Patentability mailed Aug. 18, 2016, corresponding to International Application No. PCT/US2015/014868.

International Search Report and Written Opinion dated May 14, 2015, for International Application No. PCT/US2015/014868.

* cited by examiner

SYSTEM AND METHOD FOR REDUCING POWER LOSS IN SWITCHED-CAPACITOR POWER CONVERTERS

RELATED APPLICATIONS

This application is a 35 U.S.C. §371 filing of International Application No. PCT/US2015/014868, filed Feb. 6, 2015, which claims the benefit of priority of U.S. Provisional Patent Application Ser. No. 61/937,293, filed Feb. 7, 2014, which is incorporated herein by reference in its entirety.

TECHNICAL FIELD OF ART

This invention relates to resonant switched-capacitor power converters, and particularly to systems and methods for providing a variable output voltage or current for resonant switched-capacitor converters.

BACKGROUND

Power converters are widely used in a range of electronic and electro-mechanical systems to efficiently process and deliver energy where the energy source may supply power at one voltage level and the load requires a substantially different voltage level. Efficient power converters use switching techniques and energy storage components such as capacitors or inductors to transform voltage and current levels to the levels required by the load. For example, a microprocessor may operate at 1 V and 100 A, but the system power bus or battery provides a 12 V supply. A power converter, in this case a DC-DC converter, is needed to transform the 12 V supply to a 1 V supply that can be used by the microprocessor.

Conventional 'Switched Capacitor (hereinafter "SC") converters are well known in the art]. Resonant switched capacitor (hereinafter "ReSC") converters have similarities to SC converters in terms of the applicable architectures, but are less well known in the art. Typically, SC and ReSC converters operate only with fixed conversion ratios (for example ½, 2, ⅔, 3, etc) when operating efficiently.

FIG. 1 shows a prior art behavioral model 100 of SC and ReSC converters considering only DC operation. The converters can be modeled as an ideal transformer that converts voltage $V_{IN}$ to substantially $V_{OUT}=V_{IN}*M$, where M is defined here as the ideal conversion ratio of the converter (M is shown represented by the turns ratio of an equivalent transformer model). By the power conservation of the transformer model, the input and output currents are also scaled by the conversion ratio such that $I_{IN}$ is substantially $I_{IN}=M*I_{OUT}$. The parameter $R_{EFF}$ in FIG. 1 represents the effective output resistance of the converter. Details of calculating $R_{EFF}$ for SC converters are provided in H. Le, S. R. Sanders, E. Alon, "Design Techniques for Fully Integrated Switched-Capacitor DC-DC converters," IEEE J. Solid-State Circuits, 2011, vol. 46, no. 9, pp. 2120-2131 (attached hereto as Appendix A). Details of calculating $R_{EFF}$ for ReSC converters are provided in K. Kesarwani, R. Sangwan, and J. T. Stauth, "Resonant Switched-Capacitor Converters for Chip-Scale Power Delivery: Modeling and Design," IEEE Workshop on Control and Modeling for Power Electronics (COMPEL), 2013 (attached hereto as Appendix B). It is typically desirable to have lower $R_{EFF}$ as this implies lower conduction losses in the circuit and that the conversion ratio will be closer to the ideal conversion ratio when the load is drawing substantial current. Here, therefore, we will define the ideal conversion ratio as $M=V_{OUT}/V_{IN}$ for the case where $R_{EFF}$ is substantially zero or $I_{IN}=M*I_{OUT}$ is substantially zero.

SC DC-DC converters have gained prominence in recent years due to several favorable characteristics. One advantage of SC converters is that they provide better utilization of semiconductor switching devices (such as MOSFETS) compared to inductor-based topologies (such as buck or boost converters). This is especially true in situations where the ratio of the supply voltage to the required output voltage (the conversion ratio) is high. Specifically, the advantage of SC topologies is the ability to operate with lower conduction loss (power loss that occurs due to the flow of electrical current) for a given voltage-current (V-A) current rating of the power devices.

Additional trends that favor SC converters are the inherently higher energy-density (defined as the maximum energy storage a component can achieve divided by the component's area or volume) of capacitors compared to inductors in many voltage and current ranges. The energy-density of capacitors that can be integrated using currently available semiconductor micro-fabrication techniques is considerably higher than can be achieved using integrated inductors and other magnetic components. Also, new micro-fabrication techniques have enabled much higher energy density for capacitors compared to what was available in traditional semiconductor processes.

In the prior art, methods have been described to adjust the output voltage of SC circuits by adjusting the effective output resistance, $R_{EFF}$, of the SC converter. For example in the SC converter, the switching frequency can be reduced to increase output resistance. Therefore, at a fixed load current, higher resistance will reduce the output voltage consistent with the resistive load line of the converter. However, this mode of regulation is inherently inefficient, much like a linear regulator. Also, this method can only adjust the output voltage down from a nominal conversion ratio.

ReSC converters have several advantages compared to SC converters. ReSC converters utilize magnetic energy storage to resonate out the reactive impedance of capacitor energy storage devices. This enables them to operate at lower switching frequencies while still achieving comparable conduction loss. Operating at lower switching frequencies reduces frequency-dependent losses such as power required to turn semiconductor switches on and off, and bottom-plate switching losses. FIG. 2 depicts prior art a graph 200 comparing $R_{EFF}$ normalized to the parasitic effective series resistance, $R_{ESR}$, of both SC 202 and ReSC 204 converters versus frequency. In both cases, the same total capacitance is used, and the converters operate with the same $R_{ESR}$. Several major features are seen: 1) both SC and ReSC converters have $R_{EFF}$ that varies with frequency, 2) the ReSC converter can achieve nearly the same $R_{EFF}$, but at a lower (resonant) frequency, 3) in both converters the minimum $R_{EFF}$ is limited by $R_{ESR}$.

FIG. 3 depicts a representative prior art SC converter 300 configured to provide an ideal conversion ratio of ½ between the supply, $V_{IN}$ 302, and output, $V_{OUT}$ 304. FIG. 4 depicts a representative prior art ReSC converter 400 configured to provide an ideal conversion ratio of ½ between the supply, $V_{IN}$ 402, and output, $V_{OUT}$ 404. The ReSC circuit 400 of FIG. 4 includes four switching devices (418, 420, 422, and 424) each controlled by a respective one of clock signals clk1-clk4 (410, 412, 414, 416, respectively). In normal operation of ReSC 400, resonant impedance Zx 408, including capacitance Cx 406 and inductance Lx 426, are configured in parallel with $V_{IN}-V_{OUT}$ for a first time interval, T1. In interval T1, Cx 406 and Zx 408 store energy derived from supply $V_{IN}$ 402. In a second time interval, T2, Cx 406 and Zx 408 are configured in parallel with $V_{OUT}$ 404, delivering energy to the load that is connected between $V_{OUT}$ 404 and GND 409. SC 300 operates in a similar manner without having impedance Zx 408.

Alternatively, as discussed in Stauth et al U.S. Pat. Nos. 8,390,147 and 8,384,245, an energy source or load may be configured in parallel with each bypass capacitor. In this case the SC or ReSC converter can be used to balance the power flow in each energy source or load. FIG. 5 shows a prior art example 500 where energy elements E1 and E2 develop voltages V1 and V2 and are stacked in series. VT represents the total series voltage of the stack referenced to ground and is where the total energy provided or sourced from the stack is delivered to or drawn from. FIG. 6 shows a prior art hierarchical example 600 of N−1 converters configured in parallel with N energy elements to balance the power flow among the energy elements.

FIG. 7 shows waveforms for normal operation of the ReSC converter 400 of FIG. 4. In time interval T1 702, clk3 (414) and clk4 (416) are high. Signals clk1 (410) and clk2 (412) are synchronous with clk3 (414) and clk4 (416) respectively, but transition between $V_{OUT}$ 404 and $V_{IN}$ 402. In time interval T1, Zx 408 is configured in parallel with $V_{IN}$ 402 and $V_{OUT}$ 404 such that Vx=$V_{IN}$−$V_{OUT}$. In time interval T2 704, Zx 408 is configured in parallel with $V_{OUT}$ 404 such that Vx=$V_{OUT}$. If $V_{IN}$−$V_{OUT}$ is not equal to $V_{OUT}$ 404, Vx is a voltage square wave at a frequency set by T1 702 and T2 704. The frequency of the square wave is substantially $f_{sw}$=1/(T1+T2). Normally $f_{sw}$ is substantially equal to a resonant frequency of Zx, $f_0$. If Zx is a second-order series L-C circuit, then $f_0$ is substantially $1/2\pi\sqrt{LxCx}$ for the fundamental resonant frequency. It can be seen in FIG. 2 that $f_{sw}$ could also be an integer subharmonic of $f_0$, but that this would result in higher $R_{EFF}$ than operation at $f_0$. Normally T1=T2 such that the duty cycle, D, defined as D=T1/(T1+T2) is substantially 0.5. In this case, in time interval T1 702, the current, Ix, through Zx 408 is substantially a positive half-wave rectified sinusoid. This current flows to increase the energy stored in Cx 406. In time interval T2 704, the voltage across Zx 408 is $V_{OUT}$ 404. A negative half-wave rectified sinusoid flows in Zx 408 which transfers energy to $V_{OUT}$ 404.

The magnitude of the square wave of voltage that is applied across Zx 408 is related to the amount of current drawn from $V_{OUT}$ 404 by the load. The low frequency or time-averaged behavior can be modeled by effective resistance $R_{EFF}$, as shown in FIG. 2. The conversion ratio for ideal operation, defined as operation when $R_{EFF}$ is substantially zero, is ½ for the convertor 400 of FIG. 4. $V_{OUT}$ 404 may be less than $V_{IN}$/2 due to the load current flowing through $R_{EFF}$.

The above described waveforms in FIG. 7 may additionally apply to the configurations in FIGS. 5 and 6 except that the voltage Vx would transition between V1 and V2 or V2 and V1 instead of $V_{IN}$−$V_{OUT}$ and $V_{OUT}$.

SUMMARY OF THE INVENTION

In a first aspect, a method for controlling a variable output of a resonant switched-mode converter including an input voltage (VIN), an output voltage (VOUT), a resonant impedance (Zx), and a first, second, third and fourth clock signal respectively driving a first, second, third and fourth switching devices is disclosed. The method includes: (A) configuring the resonant impedance Zx in a first configuration such that a voltage across Zx is in parallel with VIN for a first time interval; (B) configuring the resonant impedance Zx in a second configuration such that the voltage across Zx is equivalent to VIN−VOUT for a second time interval; and (C) configuring the resonant impedance Zx in a third configuration such that energy stored within Zx is transferred to VOUT for a third time interval.

In a second aspect, a method for controlling a variable output of a resonant switched-mode converter including at least two energy sources or loads, E1 and E2 having voltage values V1 and V2, respectively, stacked in series, a resonant impedance Zx having a current Ix flowing therethrough, and a first, second, third, and fourth clock signal respectively driving a first, second, third, and fourth switching devices is disclosed. The method includes: (A) configuring the resonant impedance Zx in a first configuration such that Zx is in parallel with V1 plus V2 for a first time interval; (B) configuring the resonant impedance Zx in a second configuration such that the resonant impedance Zx is in parallel with V2 for a second time interval; (C) configuring the resonant impedance Zx in a third configuration such that the current Ix flowing through resonant impedance Zx is maintained substantially at zero for a third time interval; (D) configuring the resonant impedance Zx in a fourth configuration such that the resonant impedance Zx is in parallel with V1 for a fourth time interval.

DETAILED DESCRIPTION OF THE DRAWINGS

The description below describes system and methods for controlling a switched-mode resonant power converter such that the output voltage and/or current is varied. The embodiments herein have multiple applications and for example apply to systems including, but not limited to, systems with energy sources or loads stacked in series (such as photovoltaic energy sources, batteries, fuel cells, or digital electronics loads) and where a power converter is needed to balance power flow into our out of those stacked energy sources or loads. The embodiments described allow the conversion ratio to be controlled over a range above or below the nominal conversion ratio of the circuit for ReSC converters. Systems and methods are described to adjust the output voltage (or correspondingly, output current) up or down while maintaining high conversion efficiency (or low power losses in the circuit).

Figure 8:
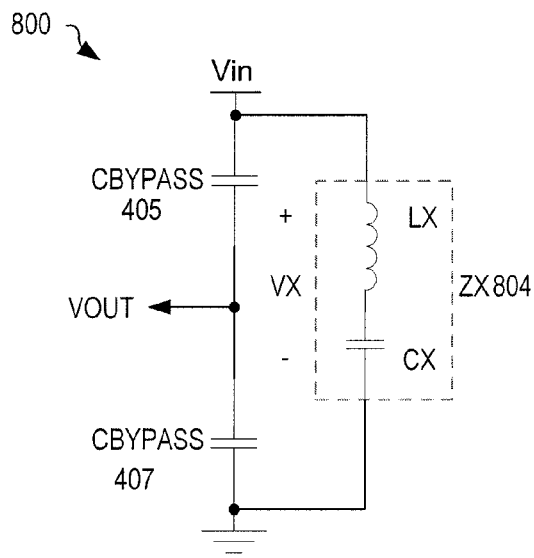
FIG. 8 depicts an exemplary representation of a 2:1 ReSC convertor to provide increased conversion ratio showing Zx configured during time interval T1, in one embodiment.
Figure 9:
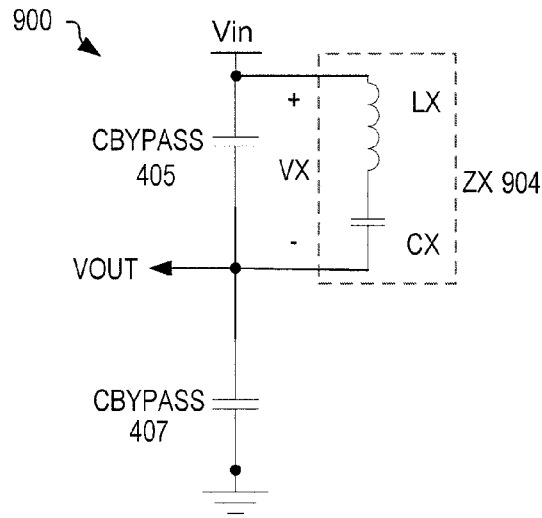
FIG. 9 depicts an exemplary representation of the 2:1 ReSC convertor of FIG. 8 showing Zx configured during time interval T2.
Figure 10:
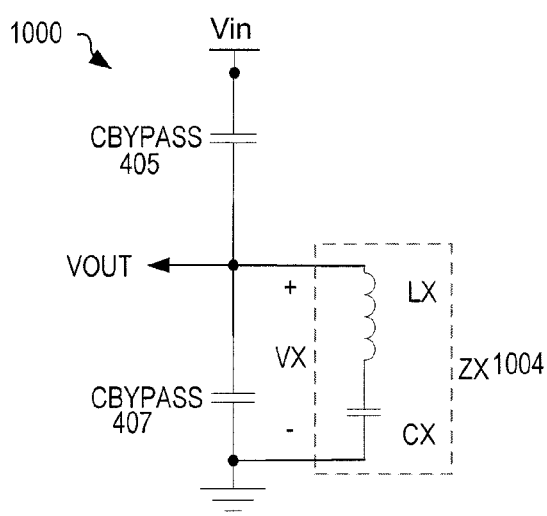
FIG. 10 depicts an exemplary representation of the 2:1 ReSC convertor of FIG. 8 showing Zx configured during time interval T3.
Figure 11:
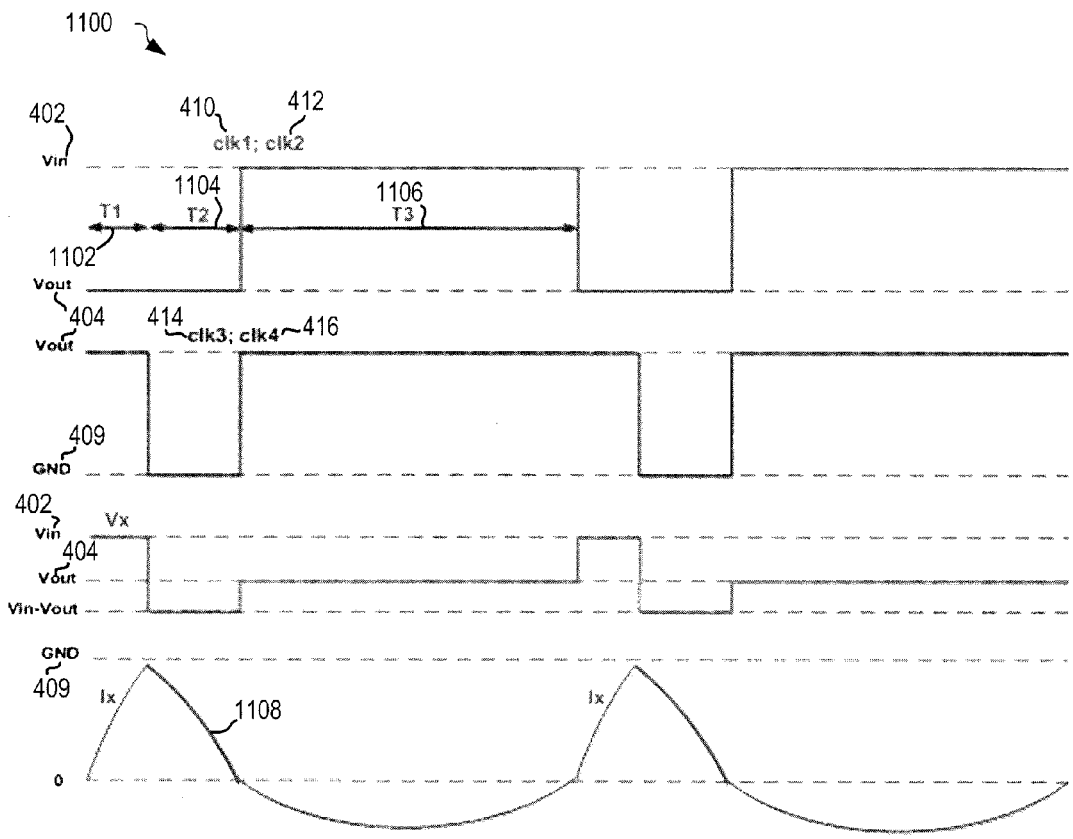
FIG. 11, the clock signals clk1-clk4 are configured such that the ReSC converter achieves conversion ratios higher than the nominal ½.

FIG. 8 depicts an exemplary configuration 800 of the 2:1 ReSC converter 400 to provide increased conversion ratio showing an impedance Zx 804 configured during time interval T1. FIG. 9 depicts an exemplary configuration 900 of the 2:1 ReSC converter 400 showing Zx 904 configured during time interval T2. FIG. 10 depicts an exemplary configuration 1000 of the 2:1 ReSC convertor 802 showing Zx 1004 configured during time interval T3. FIG. 11 illustrates a waveform timing diagram 1100 showing time intervals T1-T3 (1102, 1104, 1106, respectively). The configurations shown within FIGS. 8-10 are representations based on the ReSC converter 400 of FIG. 4. Again, the ReSC converter 400 of FIG. 4 includes four switching devices (418, 420, 422, and 424) each controlled by a respective one of clock signals clk1-clk4 (410, 412, 414, 416, respectively). Bypass capacitors 405 and 407 are used to complete a low resistance resonant loop for resonant impedance Zx 408.

In order to provide higher voltage across Cx 406 and corresponding higher average voltage across $V_{OUT}$ 404, time intervals T1-T3 are used to control the time that impedance Zx 408 is configured in one of configurations 800, 900, or 1000.

As illustrated in FIG. 11, the clock signals clk1-clk4 are configured such that the ReSC converter 400 achieves conversion ratios higher than the nominal ½. In T1 (1102), current Ix 1108, which illustrates the current flowing through impedance Zx 408, increases consistent with having voltage $V_{IN}$ 402 across Zx 408. In time interval T2 (1104) the current Ix 1108 changes consistent with having voltage $V_{IN}$-$V_{OUT}$ across Zx 408. In time interval T3 (1106), energy is transferred to $V_{OUT}$ 404 with current Ix 1108 flowing in the opposite direction of the flow of current Ix 1108 during time intervals T1 (1102) and T2 (1104). In ideal operation, current Ix 1108 substantially reaches zero at the end of time intervals T2 (1104) and T3 (1106). The current is substantially zero after T3 (1106) assuming T3 (1106) is equal to $1/(2f_0)$ where $f_0$ is the resonant frequency of Zx 408.

Figure 12:
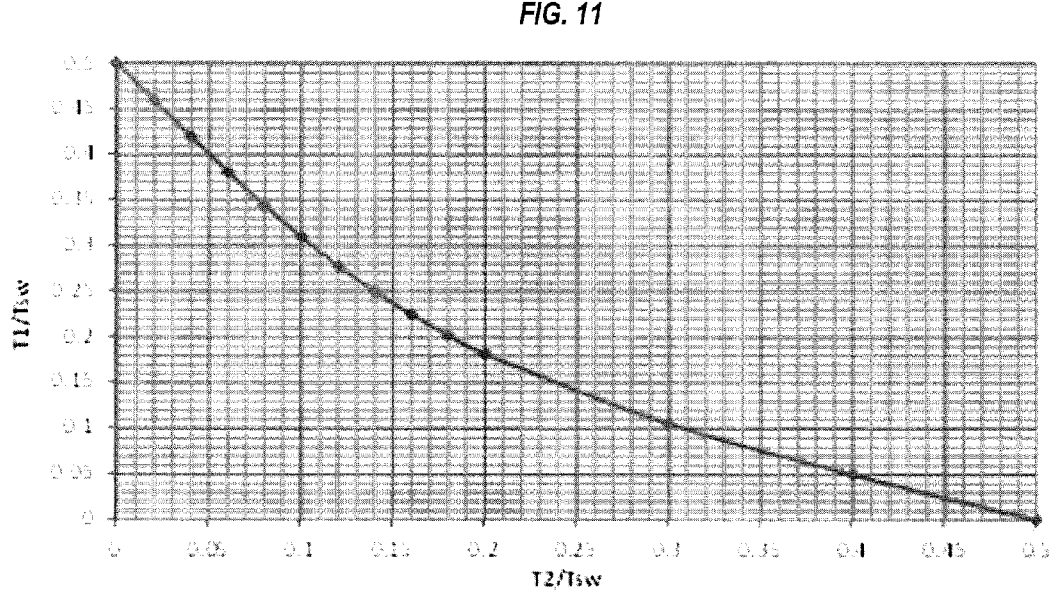
FIG. 12 depicts representative timing of T1 and T2, of FIG. 11, relative to the nominal switching period $T_{sw}$=1/$f_0$.

FIG. 12 depicts representative timing of T1 (1102) and T2 (1104), of FIG. 11, relative to the nominal switching period $T_{sw}=1/f_0$. T2 (1104) is adjusted such that the current Ix 1108 is substantially zero at the end of T2 (1104). T1 (1102) is adjusted to change the conversion ratio of the converter (i.e. ReSC converter 400). For higher T1 (1102), the average output voltage will increase because the average voltage across Zx 408 in the time interval T1+T2 will increase. In the ideal case, the average current through Zx 408 in the combined time interval T1+T2+T3 must be zero.

Figure 13:
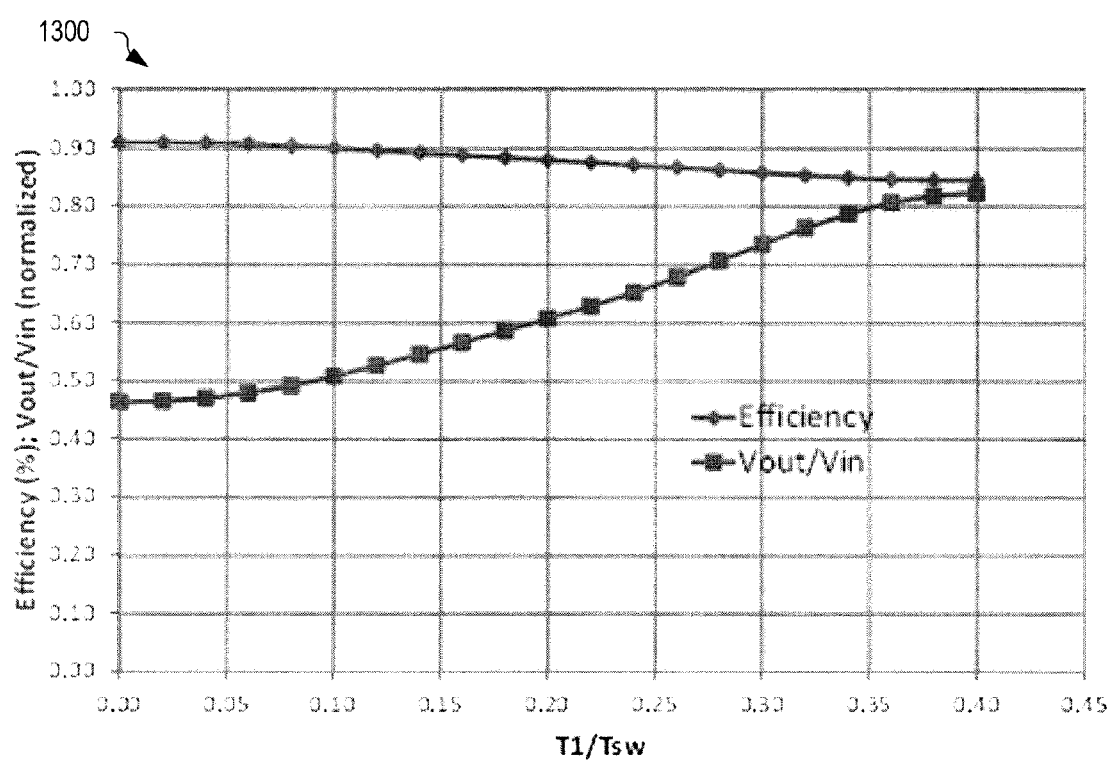
FIG. 13 depicts results for a SPICE simulation for the converter in FIG. 8.

FIG. 13 depicts results 1300 of a SPICE simulation for ReSC converter 400 used in FIG. 8. As illustrated, $T1/T_{sw}$ is varied for ReSC converter 400 using realistic models of the switching devices 418, 420, 422, and 424 (i.e. simulated as MOSFET switching devices as), the inductance Lx 426, and capacitance Cx 406. Results 1300 captures resistance and switching loss of MOSFET devices, AC resistance of a 2.2 nH air-core solenoid inductor, and assume Cx=10 nF with 3% bottom plate capacitance. The load is simulated as drawing 1.2 amps of current, $V_{IN}$ 402 is set to 2 V, and at nominal ½ conversion ratio, $V_{OUT}$ 404 is just under 1 V. The output is lower than 1V for the 2:1 mode because of effective resistance $R_{EFF}$ of the converter. The efficiency in the 2:1 mode is just over 90%. As T1 (1102) increases, the simulation adjusts T2 (1104) to achieve zero current at the end of T2 (1104), for example, following the curve in FIG. 12. It can be seen in FIG. 13 that the effect of increasing the fraction $T1/T_{sw}$, the output voltage increases with $V_{OUT}/V_{IN}$ going from just under 0.5 to over 0.8. Importantly, the efficiency stays above 80% over this range, demonstrating the value of the approach.

Variable ReSC Operation Utilizing Series-Stacked Energy Sources or Loads

Figure 5:
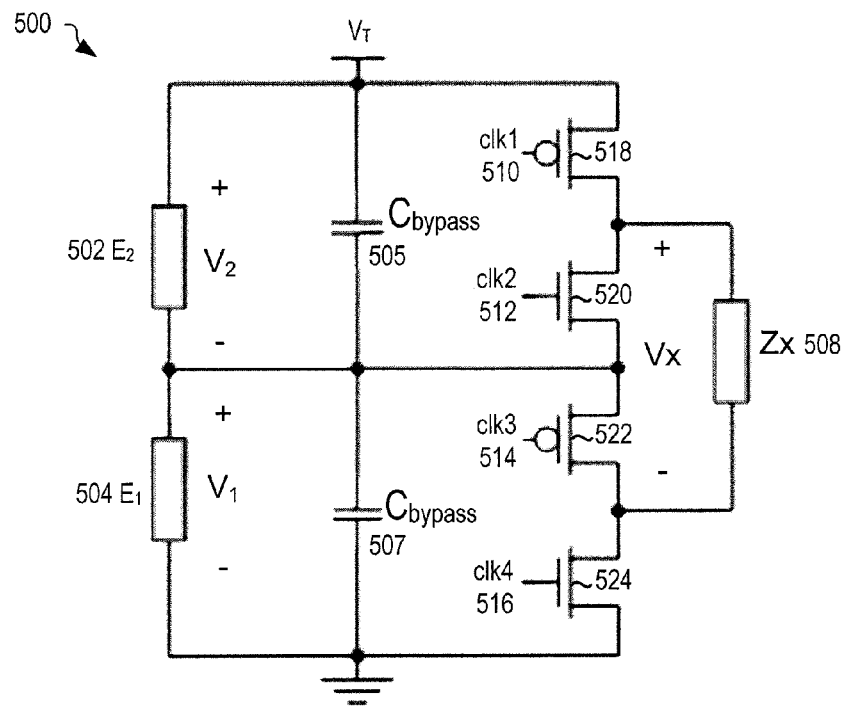
FIG. 5 shows a prior-art example where energy elements E1 and E2 develop voltages V1 and V2 and are stacked in series.
Figure 14:
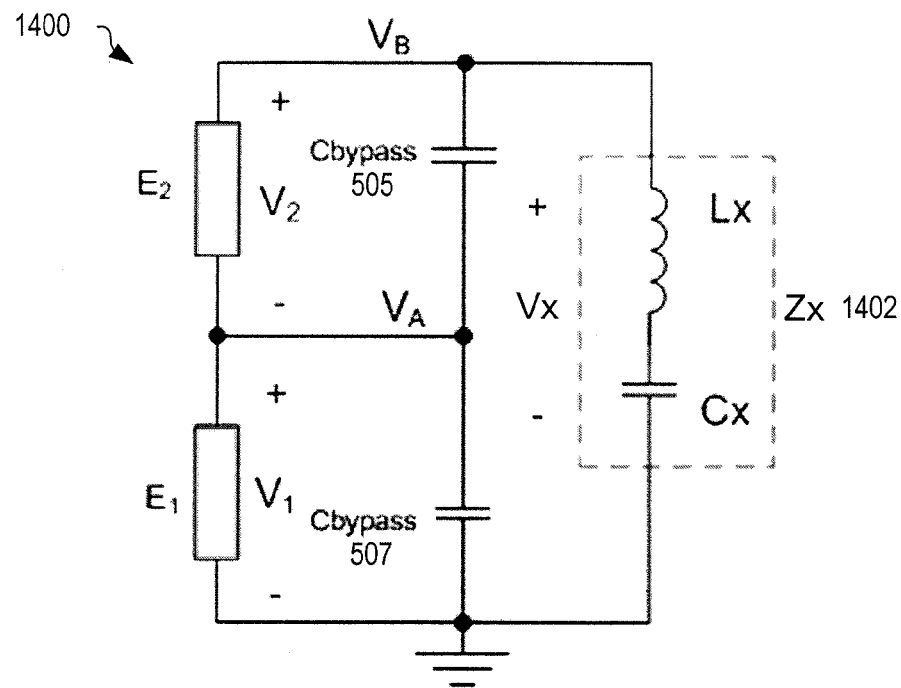
FIG. 14 depicts a representation of the ReSC converter 500 of FIG. 5, having energy sources or loads stacked in series, showing Zx configured during time interval TA.
Figure 15:
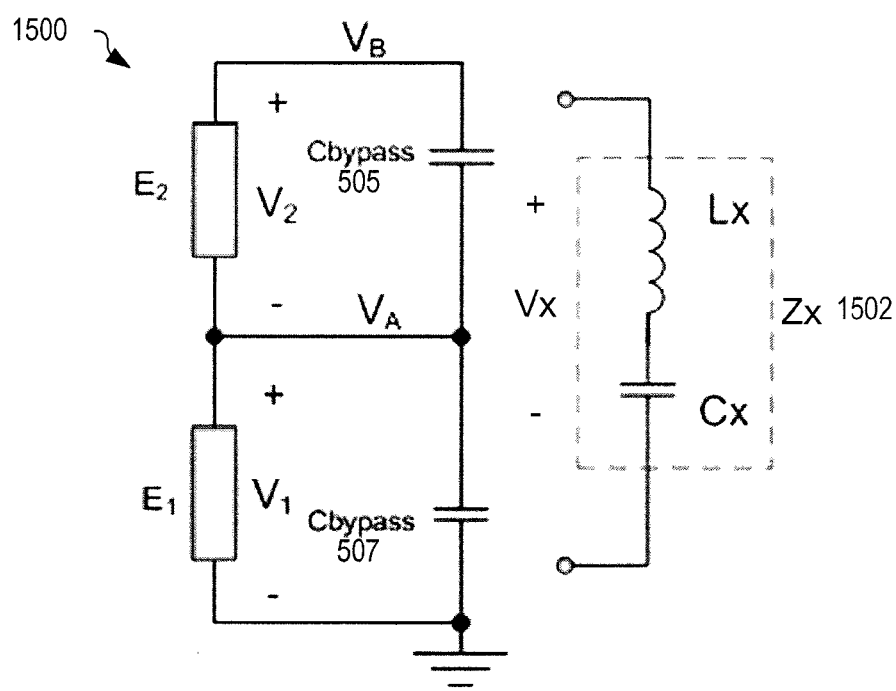
FIG. 15 depicts a representation of the ReSC of FIG. 5, having energy sources or loads stacked in series, showing Zx configured during time interval TB.
Figure 16:
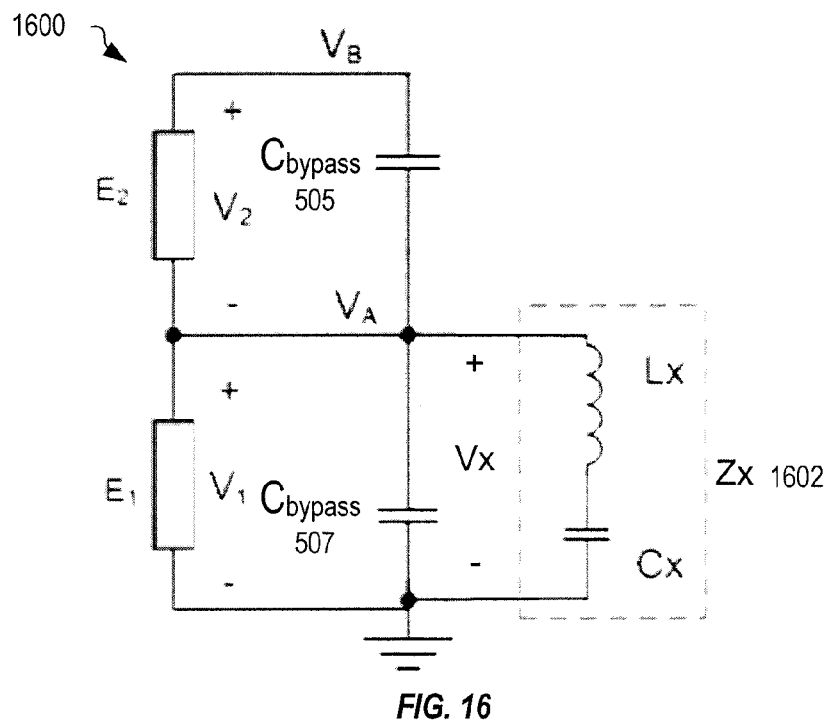
FIG. 16 depicts a representation of the ReSC of FIG. 5 showing Zx configured during time interval T1.
Figure 17:
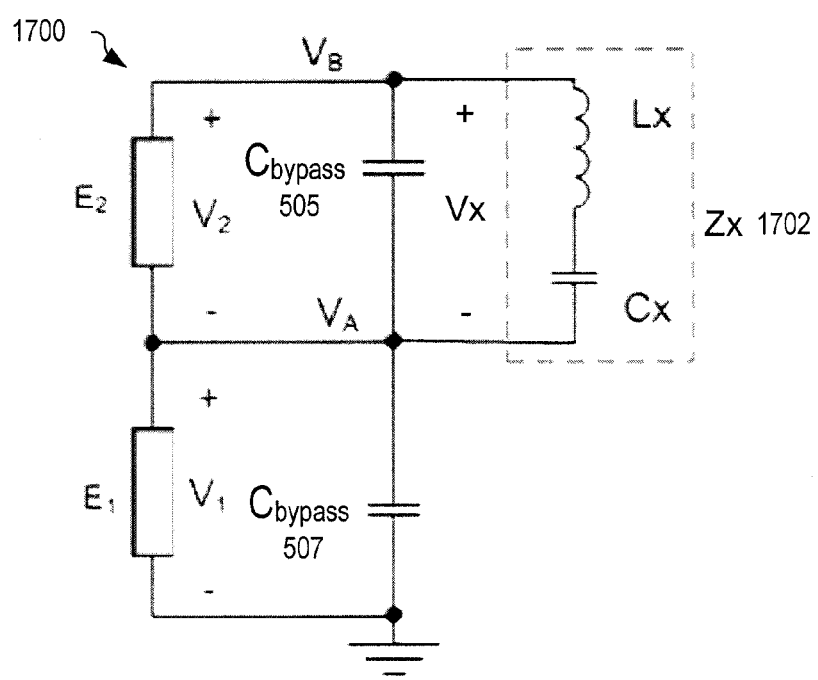
FIG. 17 depicts a representation of the ReSC of FIG. 5 showing Zx configured during time interval T2.
Figure 18:
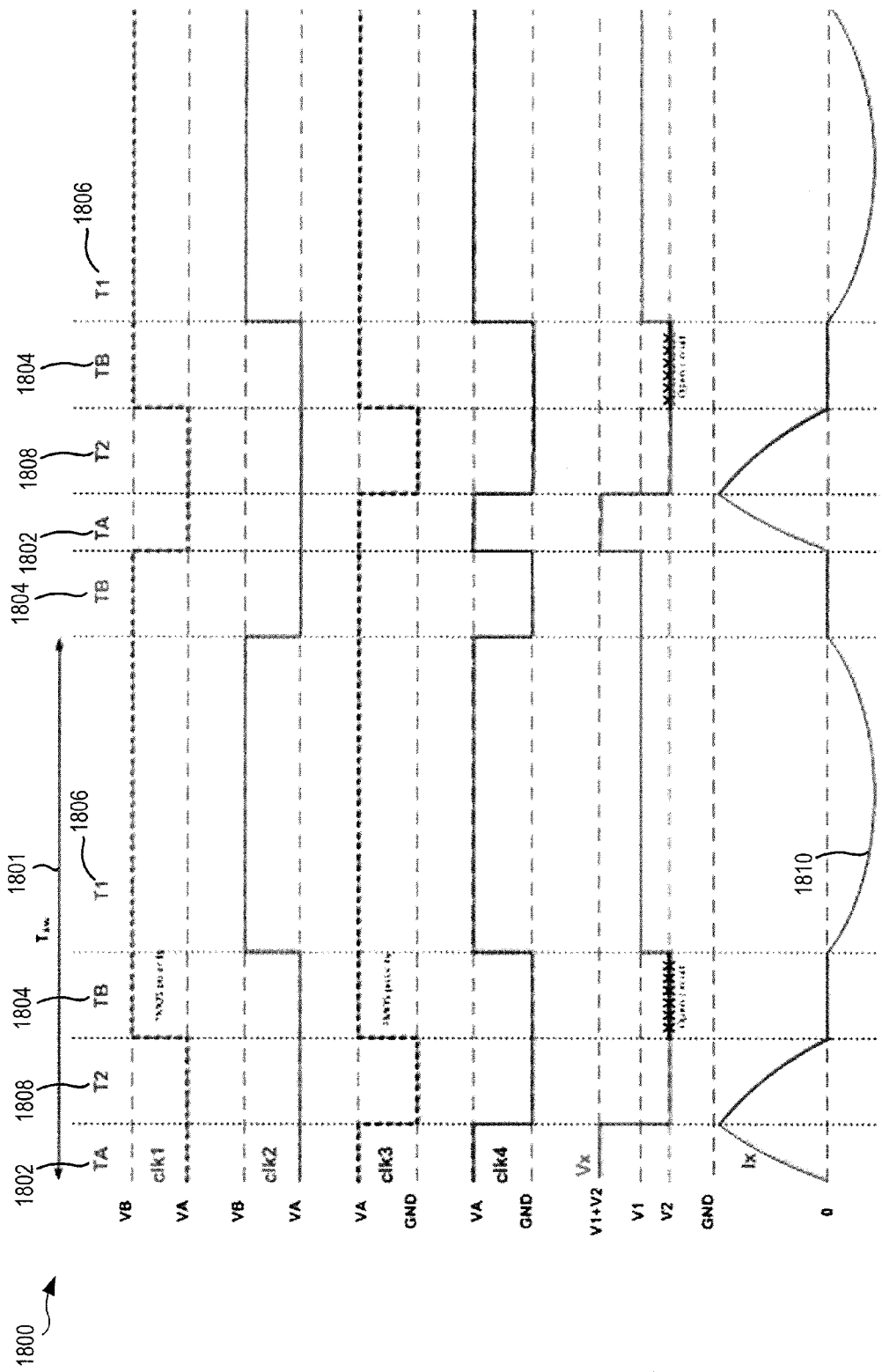
FIG. 18 depicts a timing diagram of the waveforms for an operating sequence of operating the ReSC of FIG. 5 designed to increase the ratio V1/V2.

FIG. 14 depicts a configuration 1400 of the ReSC converter 500 of FIG. 5, having energy sources or loads stacked in series, showing Zx 1402 (i.e. Zx 508) configured during time interval TA 1802. FIG. 15 depicts a configuration 1500 of the ReSC converter 500 of FIG. 5, having energy sources or loads stacked in series, showing Zx 1502 (i.e. Zx 508) configured during a time interval TB 1804. FIG. 16 depicts a configuration 1600 of the ReSC converter 500 of FIG. 5 showing Zx 1602 (i.e. Zx 508) configured during time interval T1 1806. FIG. 17 depicts a configuration 1700 of the ReSC converter 500 of FIG. 5 showing Zx 1702 (i.e. Zx 508) configured during time interval T2 1808. FIG. 18 depicts a timing diagram 1800 of the waveforms for an operating sequence of operating the ReSC converter 500 of FIG. 5 designed to increase the ratio V1/V2. For clarity of illustration, it is noted that ReSC converter 500 of FIG. 5 includes two energy elements E1 (502) and E2 (504), having voltages V1 and V2, respectively. Moreover, ReSC converter 500 includes impedance Zx 508, and clock signals clk1-clk4 (510, 512, 514, 516, respectively) that drive a respective one of four switching devices (518, 520, 522, 524). FIGS. 14-18 are best viewed together with the following description.

It should be appreciated that the energy sources or loads E1 502 and E2 504, could be photovoltaic (PV) cells, strings of PV cells, or PV panels. They could also be batteries (electrochemical energy storage devices) operated during charge or discharge cycles, power supplies, passive loads (resistors), or other electronic loads. U.S. Pat. Nos. 8,390, 147 and 8,384,245 by Stauth et al. teach the use of ReSC topologies and SC topologies to balance power flow where the energy sources are photovoltaic units and desired to operate with substantially equal voltages. However, in the embodiments disclosed herein, the systems and methods balance power flow with substantially different voltages of energy elements (i.e. elements 502, 504) that may be either energy sources or loads—for example: batteries, electronic loads, fuel cells, and/or photovoltaic units.

Similar to the configuration in FIGS. 8-10, bypass capacitors 505 and 507 may be used to complete a low resistance resonant loop for resonant impedance Zx 508. This is necessary if the energy sources or loads (E1 502, E2 504) have substantial series resistance or inductance. Voltages V1 and V2 are the differential voltages that present across energy elements E1 (502) and E2 (504). Voltages VA and VB are the ground referenced voltages that occur at the respectively labeled nodes in the circuit. The configuration of the resonant impedance is split into four time intervals, TA (1802), TB (1804), T1 (1806), and T2 (1808) as shown in FIG. 18. These time intervals are not necessarily sequential and the order and duration of these time intervals can be used to set the conversion ratio between V1 and V2, and/or the difference in the currents that flow in E1 (502) and E2 (504).

FIG. 18 shows a timing diagram 1800 of the waveforms for an operating sequence designed to increase the ratio V1/V2 within the ReSC converter 500 of FIG. 5. Note that switching devices (518, 520, 522, and 524) are assumed to be MOSFETS as in FIG. 5, but could be other types of switch devices. Also note that the polarity of clk1 (510) and clk3 (514) assumes PMOS polarities (follows FIG. 5 circuit), such that when clk1 (510) and clk3 (514) are 'low' the respective switches are closed. The clk2 (512) and clk4 (516) polarities assume NMOS devices such that switches are closed when clk2 (512) and clk4 (516) are "high".

In time interval TA (1802), Zx 508 is configured (i.e. Zx 1402) in parallel with V1+V2 or ground referenced voltage VB. Current Ix 1810 flowing in Zx 508 increases due to the voltage across Zx 1602 (i.e. Zx 508). In time interval T2 (1808), Zx 508 is configured (i.e. Zx 1702) in parallel with E2 (504) which presents voltage V2 across Zx 1702 (i.e. 508). The current Ix 1810 in T2 1808 follows a portion of a resonant cycle and T2 1808 ends when the current Ix 1810 in Zx 508 is substantially zero. In time interval TB 1804 (that could occur twice per switching cycle, $T_{sw}$ 1801), all switches are off and the current 1810 in Zx 508 is maintained at zero. In time interval T1 1806, Zx 508 is configured (i.e. Zx 1602) in parallel with E1 502 which presents voltage V1 across Zx 508. In T1 1806, current IX 1810 flows out of Zx 508 and into E1 502. The current Ix 1810 in T1 1806 follows a portion of a resonant cycle and T1 1806 is substantially half of the resonant period of Zx 508. Time interval T1 1806 ends when the current Ix 1810 in Zx 508 is substantially zero. This mode of operation provides a means to increase the ratio of V1/V2.

Figure 19:
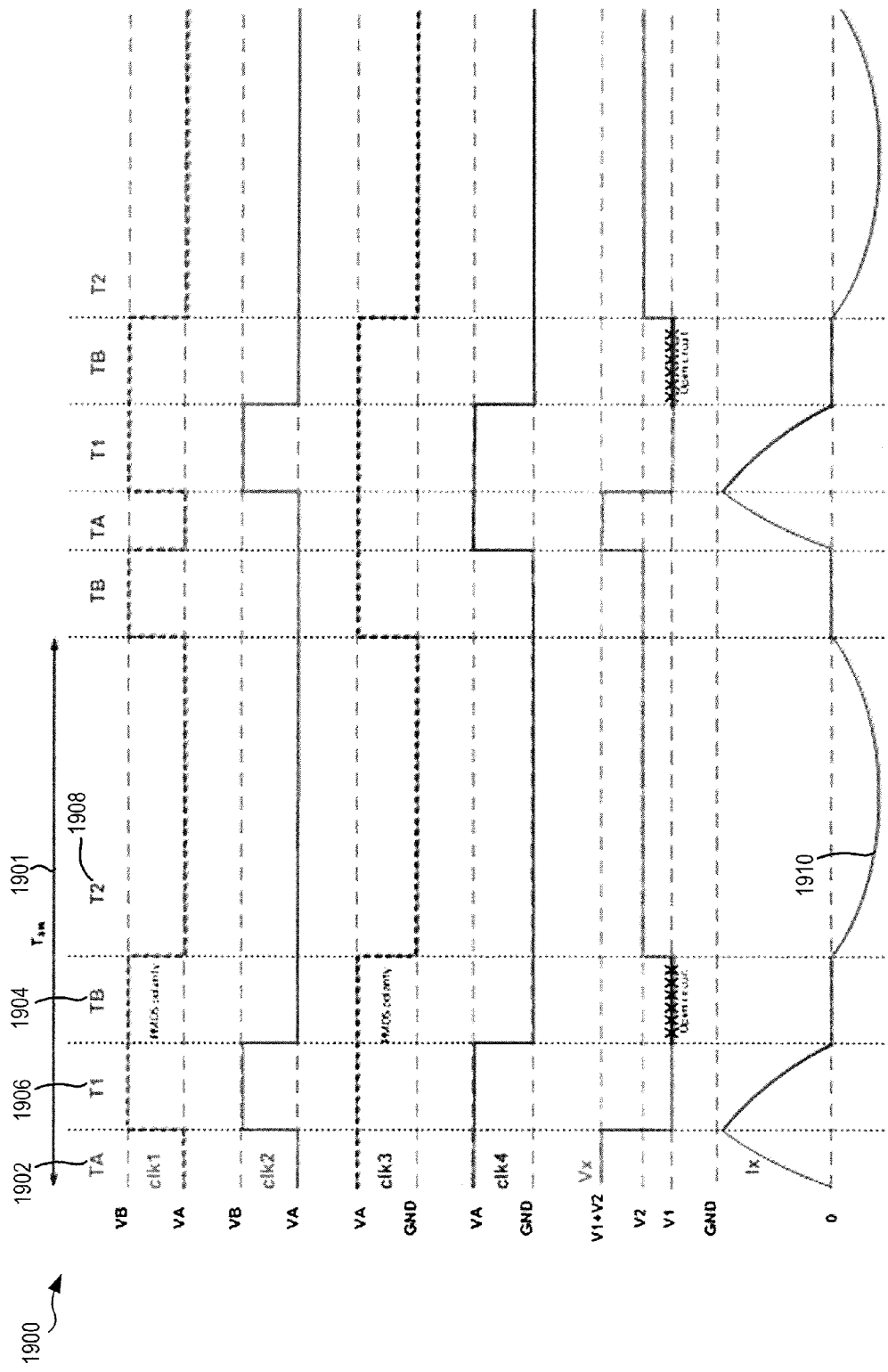
FIG. 19 shows a timing diagram of the waveforms for an operating sequence designed to increase the ratio V2/V1 within the ReSC of FIG. 5.

FIG. 19 shows a timing diagram 1900 of the waveforms for an operating sequence designed to increase the ratio V2/V1 within the ReSC converter 500 of FIG. 5. The time intervals TA 1902, TB 1904, T1 1906, and T2 1908 are similar as in FIG. 18. However, this mode sequence differs from FIG. 18 in that time interval T1 1906 follows time interval TA 1902. Therefore the difference of FIG. 19 to FIG. 18 is that the timing sequence of time intervals T1 and T2 are swapped. Accordingly, the timing sequence illustrated in FIG. 19 can increase the ratio V2/V1 within the ReSC converter 500, and corresponding configuration 1400-1700.

Off-Time Modulation

As illustrated in FIGS. 18 and 19, time interval TB (1804, 1904) may be implemented in the switching cycle when the current Ix (1810, 1910) transitions through zero. Time interval TB (1802, 1902) can be termed the 'off-time' or 'dead-time' in the switching transitions and corresponds to the state where the switches are all 'off' and Zx 508 is presented with a high impedance state where the current in Zx 508 is maintained at zero. Time interval TB (1802, 1902) can be used to implement two functionalities: 1) provides dead-time between the transition states of switches to prevent cross-conduction or shoot-through current, 2) can be used to reduce the switching frequency $f_{sw}=1/T_{sw}$, but maintain resonant operation in the circuit.

Figure 2:
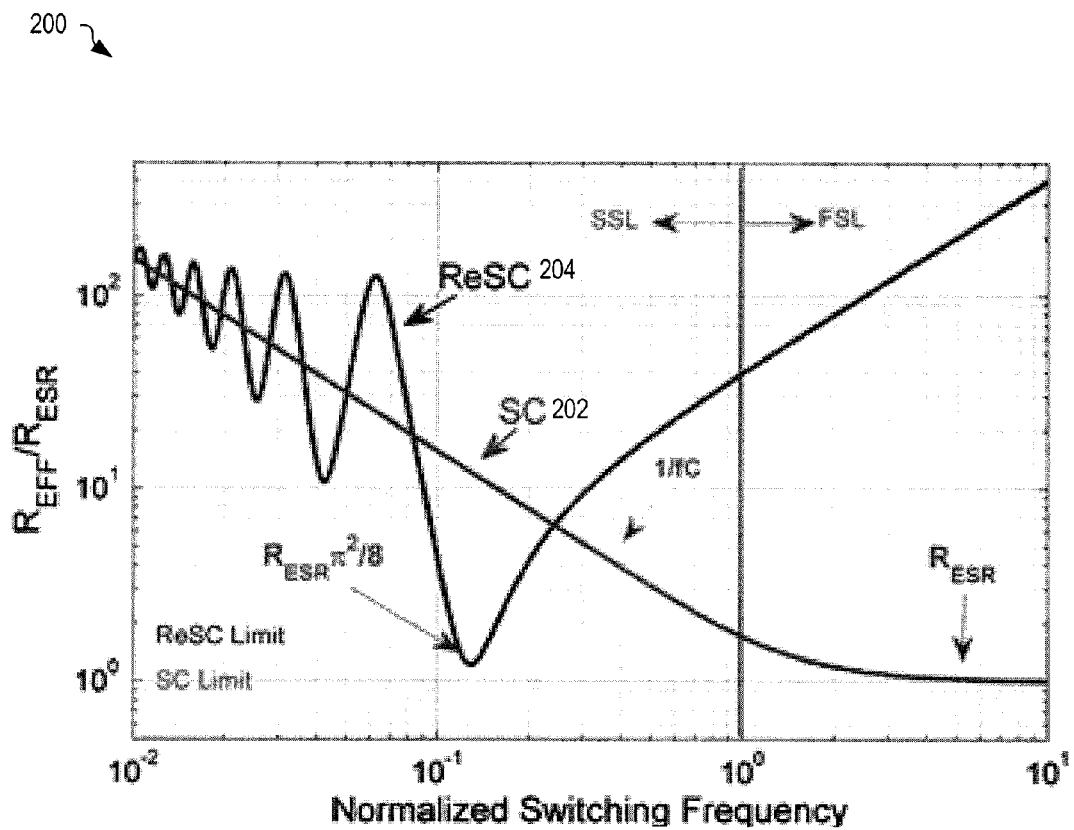
FIG. 2 depicts a prior art graph comparing $R_{EFF}$ normalized to the parasitic effective series resistance, $R_{ESR}$, of both SC and ReSC converters versus frequency.
Figure 3:
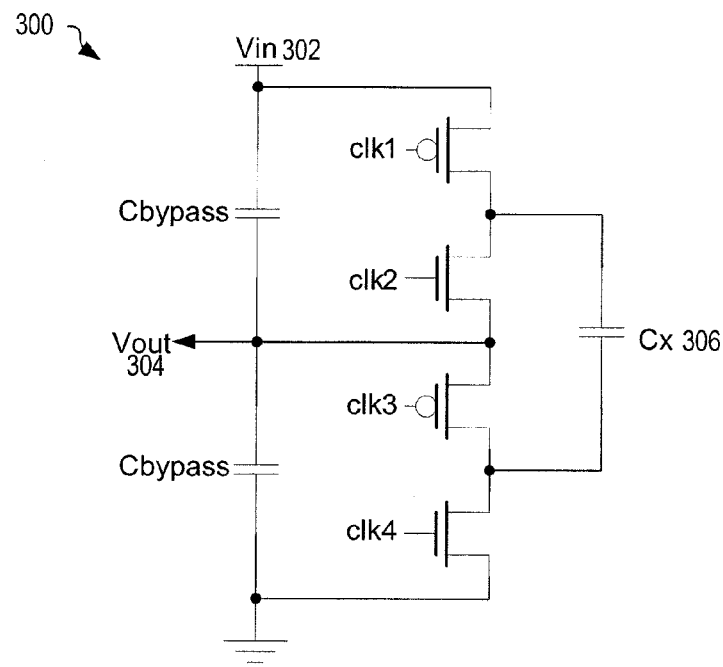
FIG. 3 depicts a representative prior art SC converter configured to provide an ideal conversion ratio of ½ between the supply, $V_{IN}$, and output, $V_{OUT}$.
Figure 20:
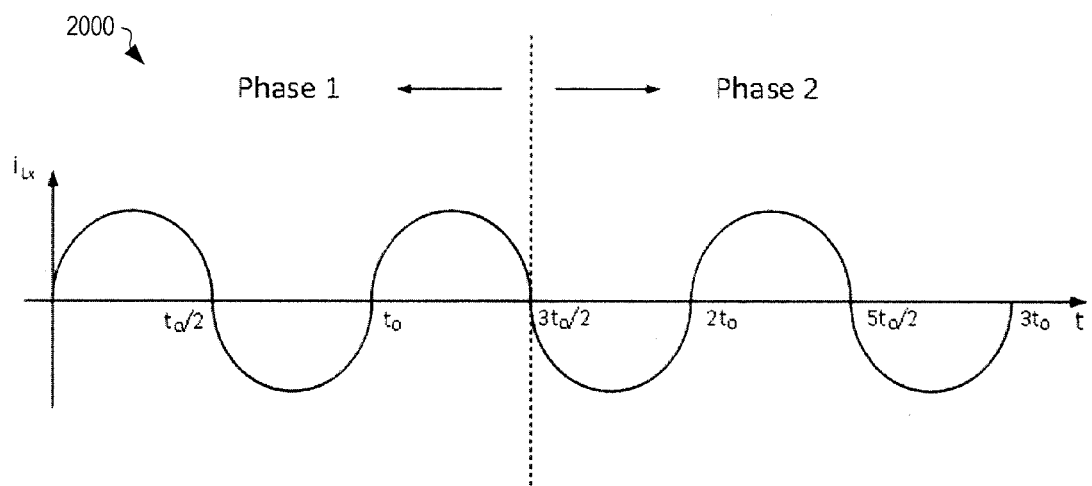
FIG. 20 depicts a simplified prior art timing diagram for the current Ix in Zx when operating at the third subharmonic, where the switching frequency is substantially ⅓ of the fundamental resonant frequency.

U.S. Pat. Nos. 8,390,147 and 8,384,245 by Stauth et al. discuss the use of operating with subharmonic modes to reduce switching frequency. These subharmonic modes correspond to the resonant minima at lower frequencies than the fundamental mode in FIG. 2. FIG. 20 depicts a simplified prior art timing diagram 2000 for the current Ix in Zx when operating at the third subharmonic, where the switching frequency is substantially ⅓ of the fundamental resonant frequency.

Figure 21:
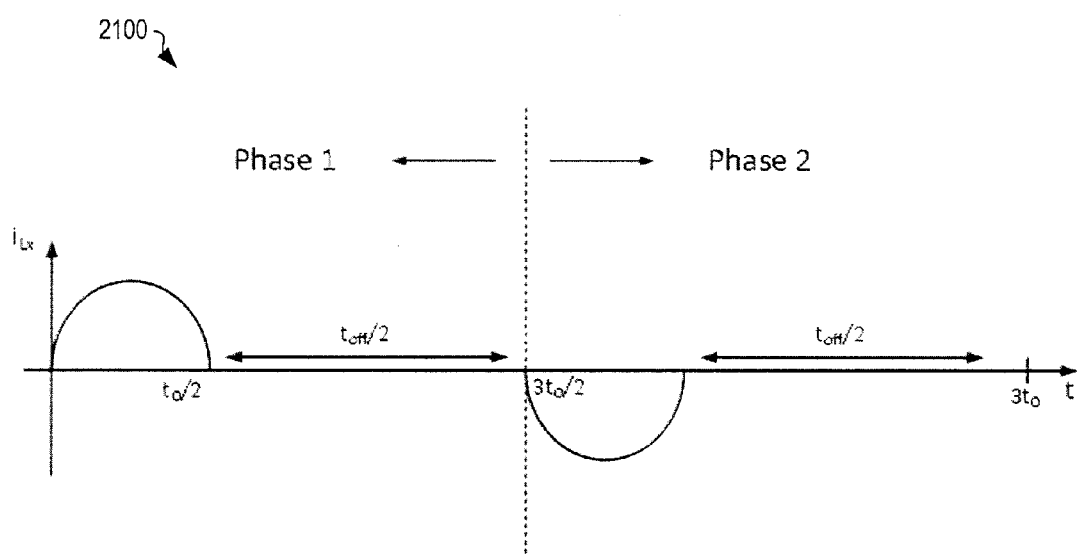
FIG. 21 depicts an exemplary simplified timing diagram for the current Ix in Zx, of FIG. 5, for an exemplary off-time modulation operation.

FIG. 21 depicts an exemplary simplified timing diagram 2100 for the current Ix in Zx 508, of FIG. 5, for an exemplary off-time modulation operation. As illustrated in FIG. 21, the switching frequency is chosen to be also ⅓ of the fundamental resonant frequency of the ReSC converter 500, for example but in the time intervals $t_{off}/2$, which would also correspond to the time intervals TB in FIGS. 18-19, the resonant impedance Zx 508 is presented with an open circuit and all the switches are 'off.' In the ideal case, the same net charge is transferred between the 'source' and 'load' of the circuit, but the resistive losses are reduced, because the extra resonant cycles (that transfer no net charge) are prevented from occurring. Normally these extra resonant cycles would result in resistive losses because the current is flowing through substantial series resistance in the switches and resonant impedance.

Figure 1:
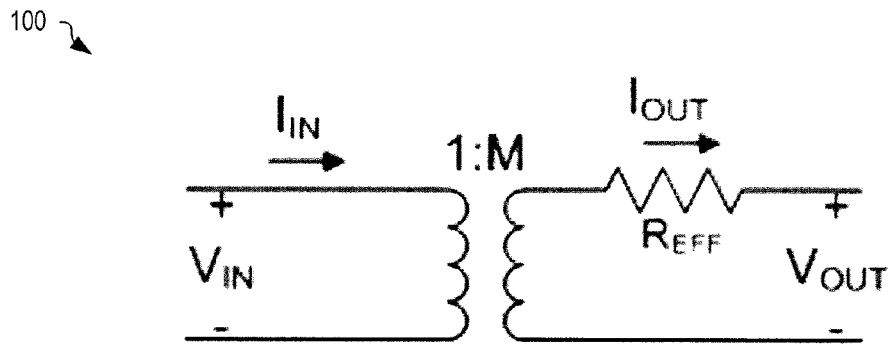
FIG. 1 shows a prior art behavioral model of SC and ReSC converters considering DC operation.

In the prior art subharmonic case illustrated in FIG. 20, the effective resistance as modelled in FIG. 1 follows substantially:

$$R_{EFF} \approx \frac{n^2 \pi^2}{8} R_{ESR},$$

where n is the subharmonic index (n=3 is the third subharmonic shown in FIG. 15). For the 'off-time modulation' case illustrated in FIG. 21, the effective resistance is:

$$R_{EFF} \approx \frac{\pi^2}{8}\left(1 + \frac{t_{off}}{t_0}\right)R_{ESR},$$

there $t_{off}$ and $t_o$ are as indicated in FIG. 21.

It should be noted that FIGS. 20 and 21 could represent the current Ix waveform flowing in Zx for either (i) the ReSC converter 400 operating in nominatlly 1:½ mode (i.e. $V_{OUT} \sim V_{IN}/2$) or (ii) the ReSC converter 500 operating in 1:1 mode (i.e. V1~V2).

Figure 4:
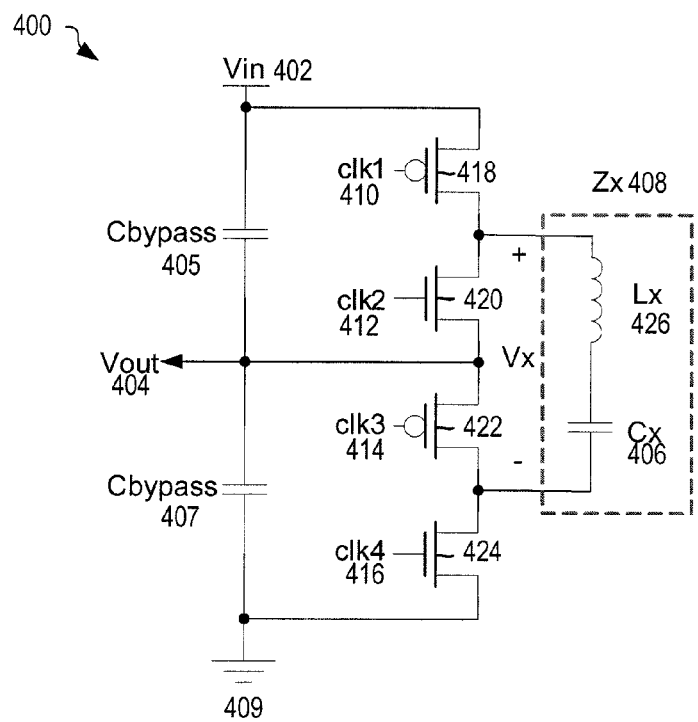
FIG. 4 depicts a representative prior art ReSC converter configured to provide an ideal conversion ratio of ½ between the supply, $V_{IN}$, and output, $V_{OUT}$.
Figure 22:
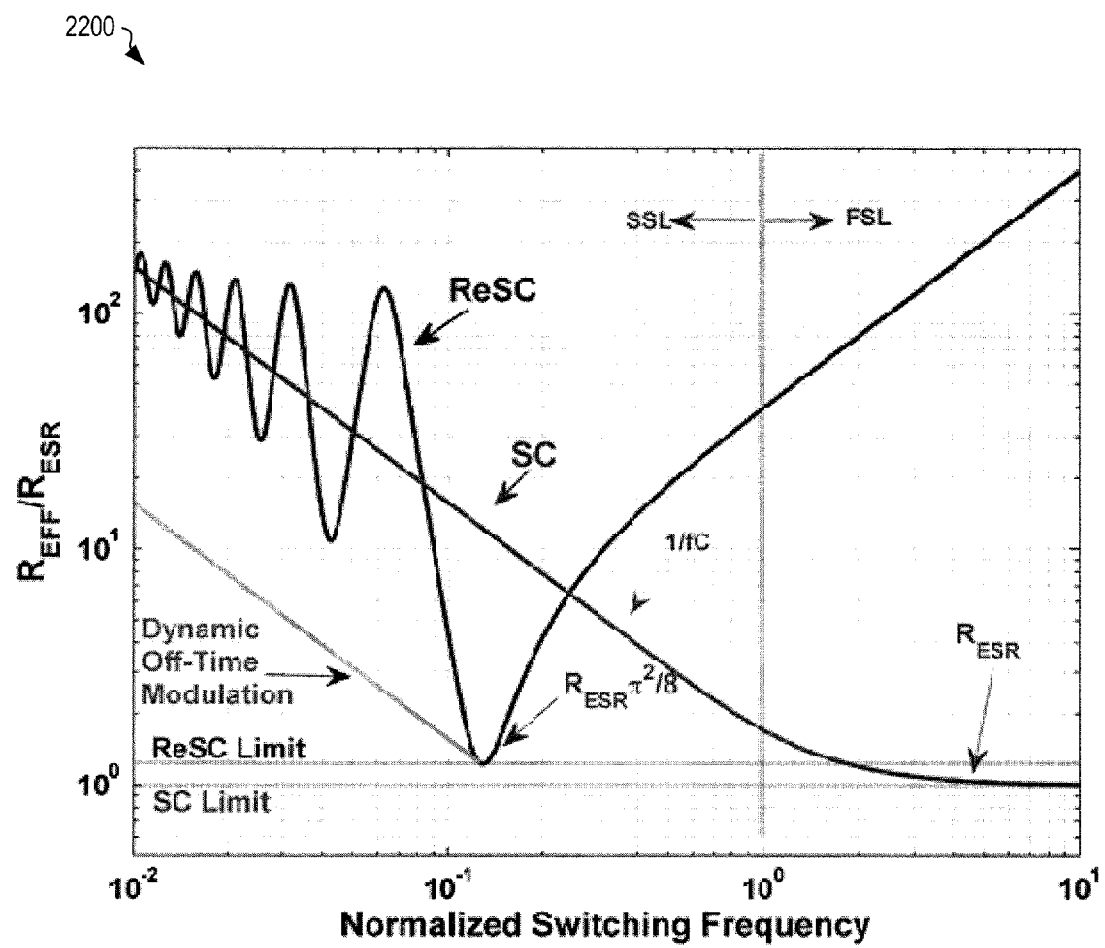
FIG. 22 depicts a comparison graph of the normalized effective resistance versus frequency for the 2:1 ReSC converter, of FIG. 4.

FIG. 22 depicts a comparison graph 2200 of the normalized effective resistance versus frequency for the 2:1 ReSC converter 400, of FIG. 4. It should be appreciated that the graph 2200 would look very similar for the ReSC converter 500, of FIG. 5, however would have a different minimum $R_{EFF}$. For example, for the ReSC converter 500, the minimum $R_{EFF}$ would be as follows:

$$R_{EFF} = R_{ESR} * \frac{\pi^2}{2},$$

whereas the present graph 2200, for ReSC converter 400 of FIG. 4 has a minimum $R_{EFF}$ equal to $$R_{EFF} = R_{ESR} * \frac{\pi^2}{8}.$$

The use of Off-time modulation has several benefits. First, off-time modulation can be used to reduce switching frequency arbitrarily below the fundamental resonant frequency. This can be used to achieve higher efficiency in 'light-load' where the power transferred from the source to the load is small and therefore conduction losses are small, but switching losses would be high if the circuit operated at the fundamental resonant mode. In subharmonic operation, only discrete frequencies are possible. Second, off-time modulation has lower $R_{EFF}$ for a given operating frequency than the prior art of using subharmonic modes, and therefore can achieve higher conversion efficiency. Third, because off-time modulation can achieve an arbitrary $R_{EFF}$ (with the lower limit set by operating in fundamental mode), it can be used to regulate the output voltage. A similar technique is used for switched capacitor converters, but uses scaling of the switching frequency to regulate the output voltage. Therefore off-time modulation can achieve a similar benefit to prior art regulation and light-load efficiency performance of SC converter, but achieve also the benefits of using a resonant converter architecture.

Figure 6:
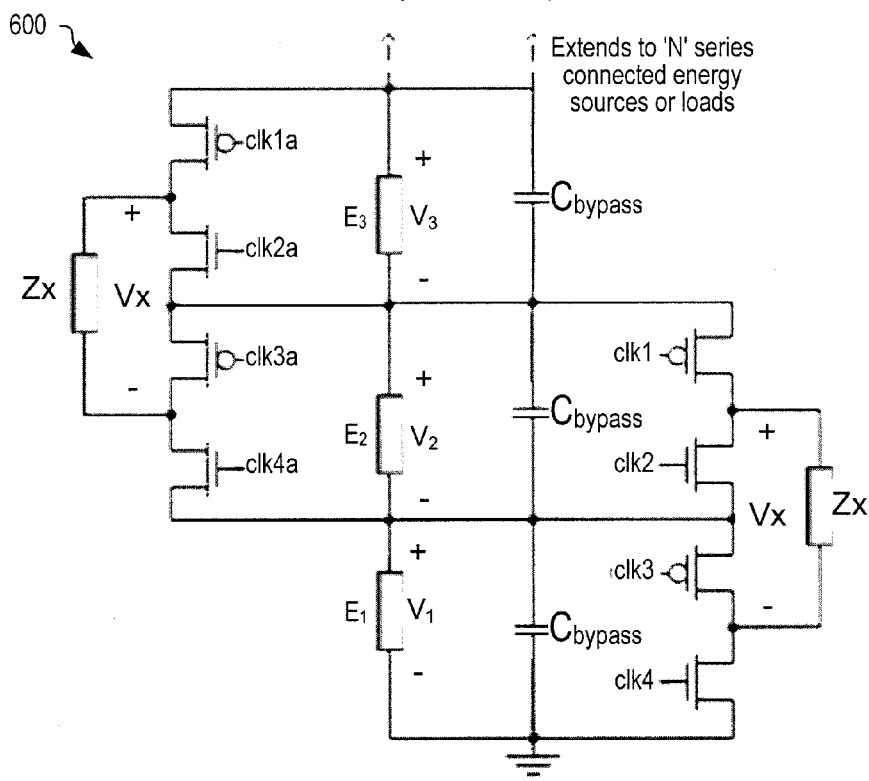
FIG. 6 shows a prior-art hierarchical example of N−1 converters configured in parallel with N energy elements to balance the power flow among the energy elements.
Figure 7:
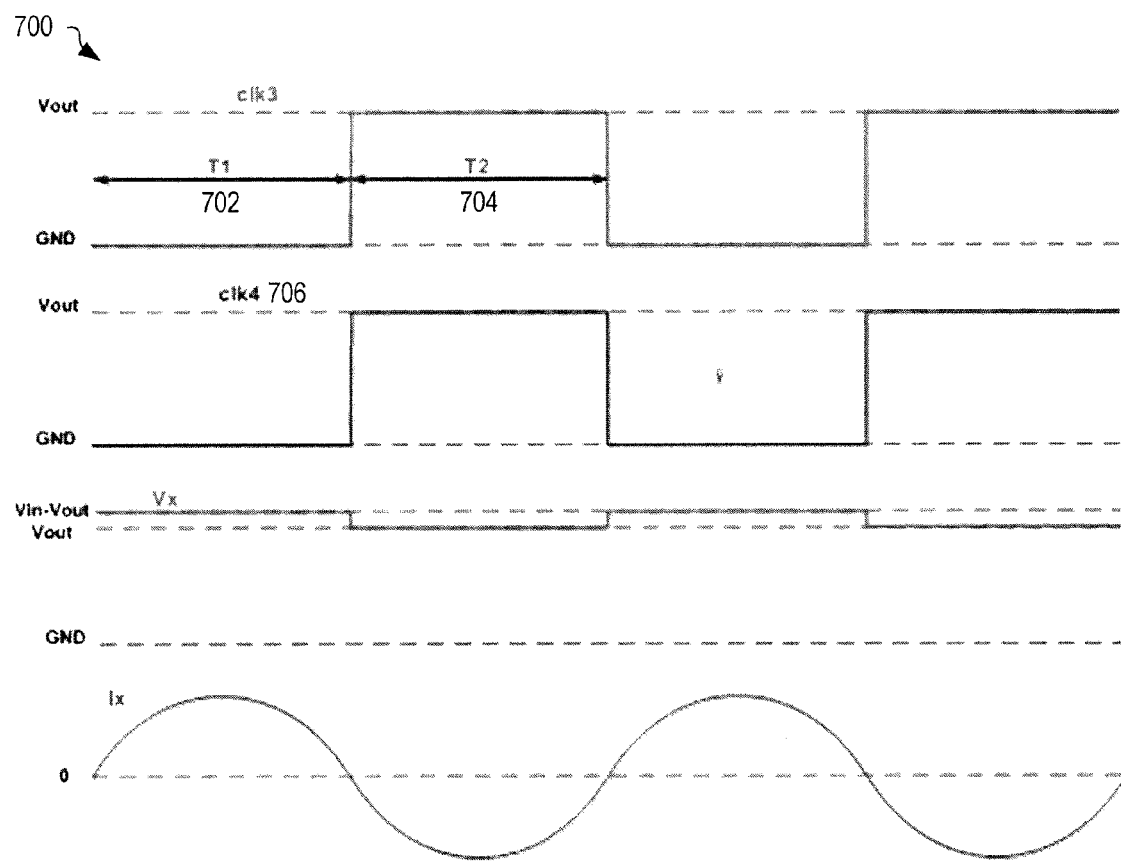
FIG. 7 shows waveforms for normal operation of the ReSC converter of FIG. 4.

The off-time modulation concept applies equally to the nominal N:1 architecture disclosed in FIG. 6 (for example FIG. 21, or FIGS. 18, and 19 where time interval TA=0), or for the embodiments where the conversion ratio is substantially higher or lower than N:1 (for example FIGS. 18 and 19 where TA>0). Accordingly, it should be appreciated that the off-time modulation technique applies not only to both ReSC converters 400 and 500, but additionally applies for any ReSC topology as means for reducing the switching frequency (i.e. increasing the total switching period) but still maintaining resonant operation in the energy transfer process. For example, in one embodiment, off-time modulation is used within a 1:½ ReSC converter to achieve variable conversion ratios.

Figure 23:
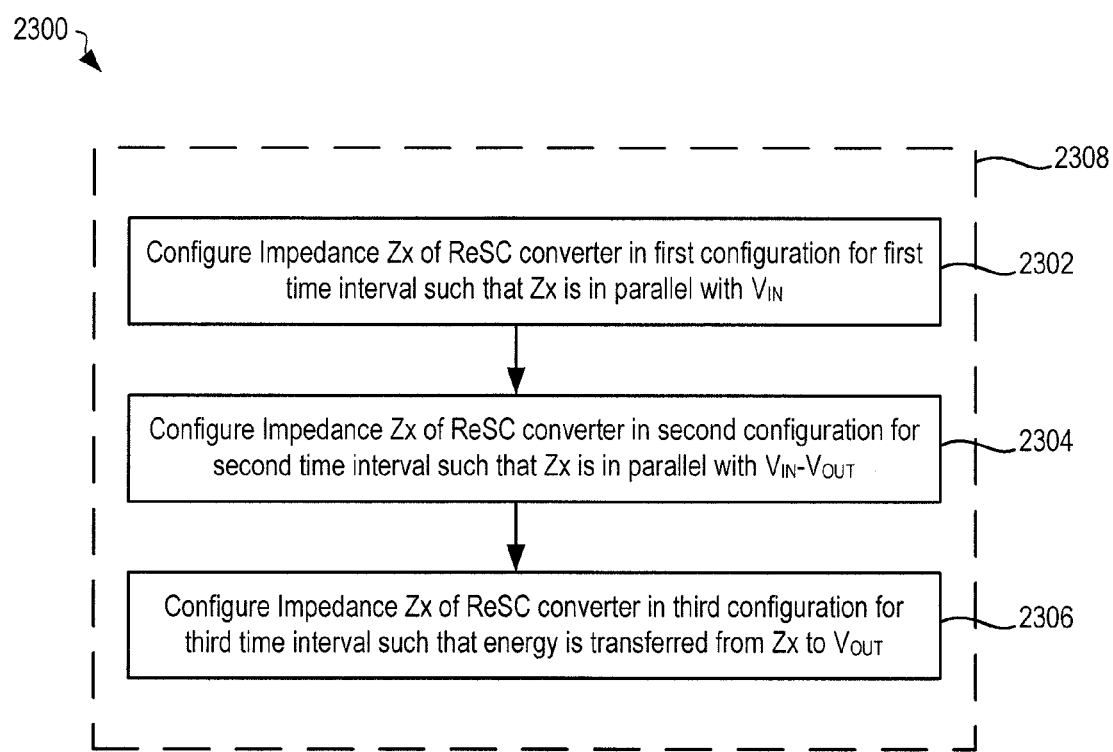
FIG. 23 depicts an exemplary flow chart detailing a method for providing increased conversion ratio of a ReSC converter, in one embodiment.

FIG. 23 depicts an exemplary flow chart detailing a method 2300 for providing increased conversion ratio of a ReSC converter, in one embodiment. For example, method 2300 is capable of altering the conversion ratio of ReSC converter 400 including four switching devices (418, 420, 422, and 424) each controlled by a respective one of clock signals clk1-clk4 (410, 412, 414, 416, respectively). Bypass capacitors 405 and 407 may be used to complete a low resistance resonant loop for resonant impedance Zx 408.

In step 2302, the ReSC is configured such that the impedance Zx of the ReSC converter is in a first configuration for a first time interval such that the voltage $V_{IN}$ is across the impedance Zx. For example, Zx 408 is configured such that current Ix 1108 flowing through the impedance Zx 408 increases consistent with having voltage $V_{IN}$ 402 across Zx 408 for a time interval T1 (1102). In one example of configuring Zx 408, clock signals clk3 (414) and clk4 (416) are set to "high" and clk1 (410) and clk2 (412) are set to "low" such that $V_{IN}$ 402 is across resonant impedance Zx 408.

In step 2304, the ReSC is configured such that the impedance Zx of the ReSC converter is in a second configuration for a second time interval such that the voltage across Zx is equivalent to $V_{IN}-V_{OUT}$. For example, Zx 408 is configured such that the current Ix 1108 decreases consistent with having voltage $V_{IN}-V_{OUT}$ across Zx 408 for a time interval T2 (1104). In one example of configuring Zx 408 according to the second configuration of step 2304, clock signals clk1-clk4 (410, 412, 414, 416, respectively) are all set to "low" such that voltage $V_{IN}-V_{OUT}$ is across Zx 408. In one embodiment, the first and second time intervals of steps 2302 and 2304 are predetermined such that Ix 1108 is substantially zero at the end of the second time interval.

In step 2306, the ReSC is configured such that the impedance Zx of the ReSC converter is in a third configuration for a third time interval such that energy is transferred to $V_{OUT}$ with the current Ix flowing in the opposite direction of the flow of current Ix during the first and second time intervals. For example, Zx 408 is configured such that energy is transferred to $V_{OUT}$ 404 for a third time interval T3 (1106). In one example of configuring Zx 408 during the third time interval, clock signals clk1-clk4 (410, 412, 414, 416, respectively) are all set to "high" such that energy is transferred to $V_{OUT}$ 404. In one embodiment, the third time interval T3 (1106) is predetermined such that Ix 1108 is substantially zero at the end of the third time interval T3 (1106).

Steps 2302-2306 are repeated continuously, as indicated by dashed outline 2308 to provide ReSC having a variable conversion ratio.

Figure 24:
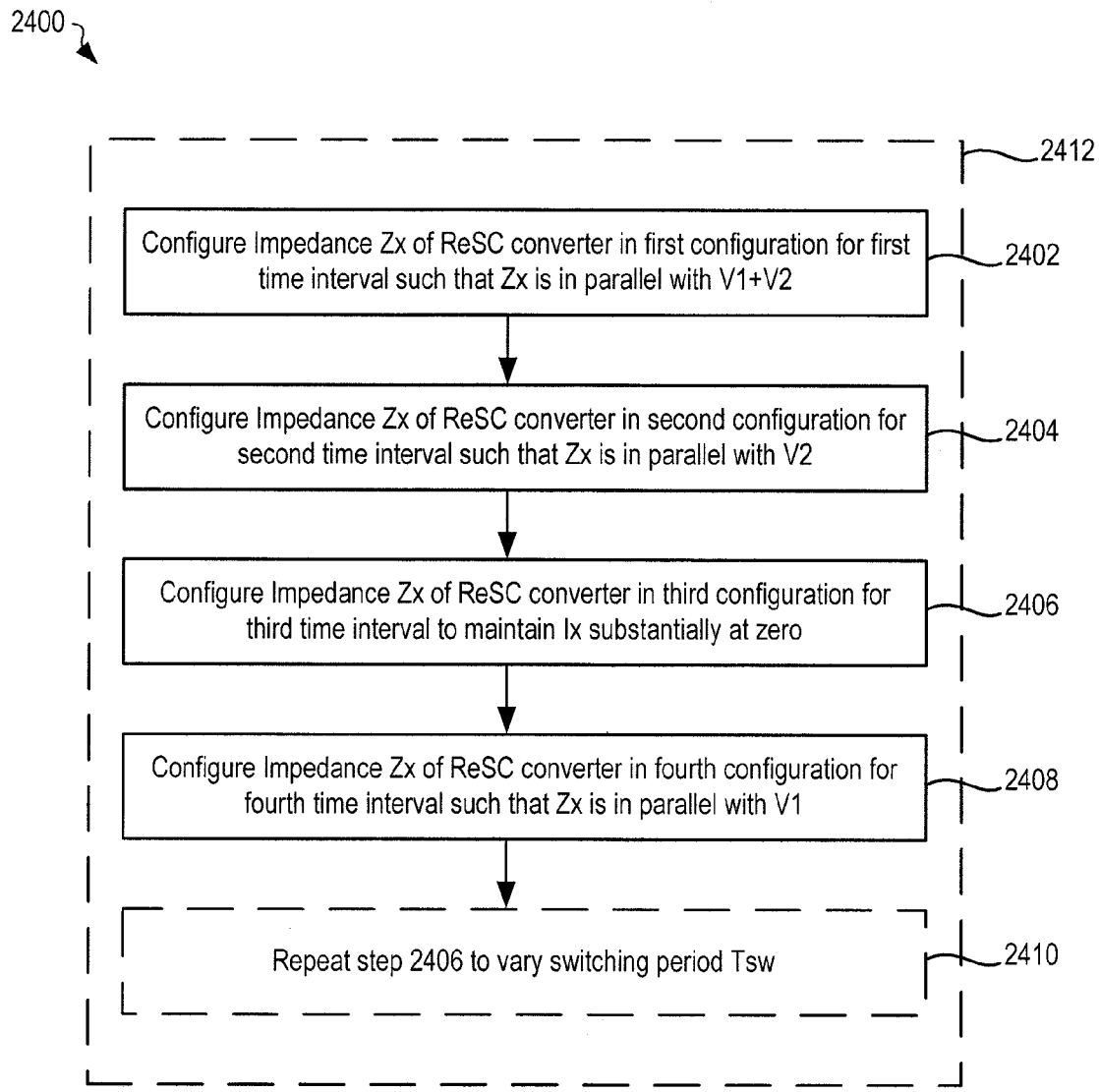
FIG. 24 depicts an exemplary flow chart illustrating a method for providing a ReSC, with energy sources or loads stacked in series, having variable conversion ratio, particularly for increasing the ratio V2/V1, in another embodiment.

FIG. 24 depicts an exemplary flow chart illustrating a method 2400 for providing a ReSC, with energy sources or loads stacked in series, having variable conversion ratio, particularly for increasing the ratio V2/V1, in another embodiment. For example, method 2400 is capable of increasing the ratio of V1/V2 of the ReSC converter 500, depicted in FIG. 5, including two energy elements E1 (502) and E2 (504), having voltages V1 and V2, respectively, and further including impedance Zx 508, and clock signals clk1-clk4 (510, 512, 514, 516, respectively) that drive a respective one of four switching devices (518, 520, 522, 524).

In step 2402, the ReSC is configured such that the impedance Zx is in parallel with V1+V2, or ground referenced voltage VB, such that current flowing in Zx increases due to the voltage across Zx for a first time interval. In one example of operation of step 2402, Zx 508 is configured to be in parallel with series-connected energy elements E1 and E2 (502 and 504, respectively) such that Ix 1808 flowing through Zx 508 increases due to voltage V1+V2 across Zx 508. For example, clock signals clk1 and clk2 (510 and 512, respectively) may be set to "low" and clock signals clk3 and clk4 (514 and 516, respectively) may be set to "high" to configure Zx 508 in parallel with V1+V2. In other words, the switching devices are configured such that the first and fourth switching devices (518 and 524, respectively) are closed, and the second and third switching devices (520 and 522, respectively) are open.

In one embodiment, utilizing operation of the ReSC converter 500 in nominal conversion ratio including off-time modulation, the first time interval is zero. In other words, step 2402 is not implemented.

In step 2404, the ReSC is configured such that impedance Zx is in parallel with V2 for a second time interval. In one example of operation of step 2404, Zx 508 is configured to be in parallel with E2 504 for time interval T2 1808 until the current Ix 1810 flowing through Zx 508 is substantially zero. For example, clock signals clk1-clk4 (510, 512, 514, and 516, respectively) may be set to "low" to configure Zx 508 in parallel with E2 504. In other words, the switching devices are configured such that the first and third switching devices (518 and 522, respectively) are closed, and the second and fourth switching devices (520 and 524, respectively) are open.

In step 2406, the ReSC is configured such that the current Ix flowing through impedance Zx is maintained substantially at zero, for a third time interval. For example, Zx 508 may be configured to be disconnected from both of E1 502 and E2 504 for time interval TB 1804. In one example, clock signals clk1 and clk3 (510 and 514, respectively) are set to "high" and clock signals clk2 and clk3 (512 and 516, respectively) are set to "low" to configure Zx 508 such that Ix 1810 is maintained substantially at zero for time interval 1804. In other words, all switching devices are configured to be open.

In step 2408, the ReSC is configured such that impedance Zx is in parallel with V1, for a fourth time interval. In one example of operation of step 2408, Zx 508 is configured to be in parallel with E1 502 for time interval T1 1806. For example, clock signals clk1-clk4 (510, 512, 514, and 516, respectively) are set to "high" such that Zx 508 is in parallel with E1 502 for time interval T1 1806. In one embodiment, the fourth time interval is equivalent to substantially half of the resonant period of Zx. In other words, the switching devices are configured such that the second and fourth switching devices (520 and 524, respectively) are closed, and the first and third switching devices (518 and 522, respectively) are open.

Step 2410 is optional as indicated by the dashed outline. In step 2410, step 2406 is repeated to vary an overall switching period $T_{sw}$ (i.e. $T_{sw}$ 1801).

Steps 2402 through 2410 are repeated continuously, as indicated by dashed outline 2412 to provide ReSC having variable ratio between stacked series inputs or loads.

In one embodiment, the current Ix flowing through the impedance Zx is substantially zero at the end of one or more of the second, third and fourth time intervals.

Figure 25:
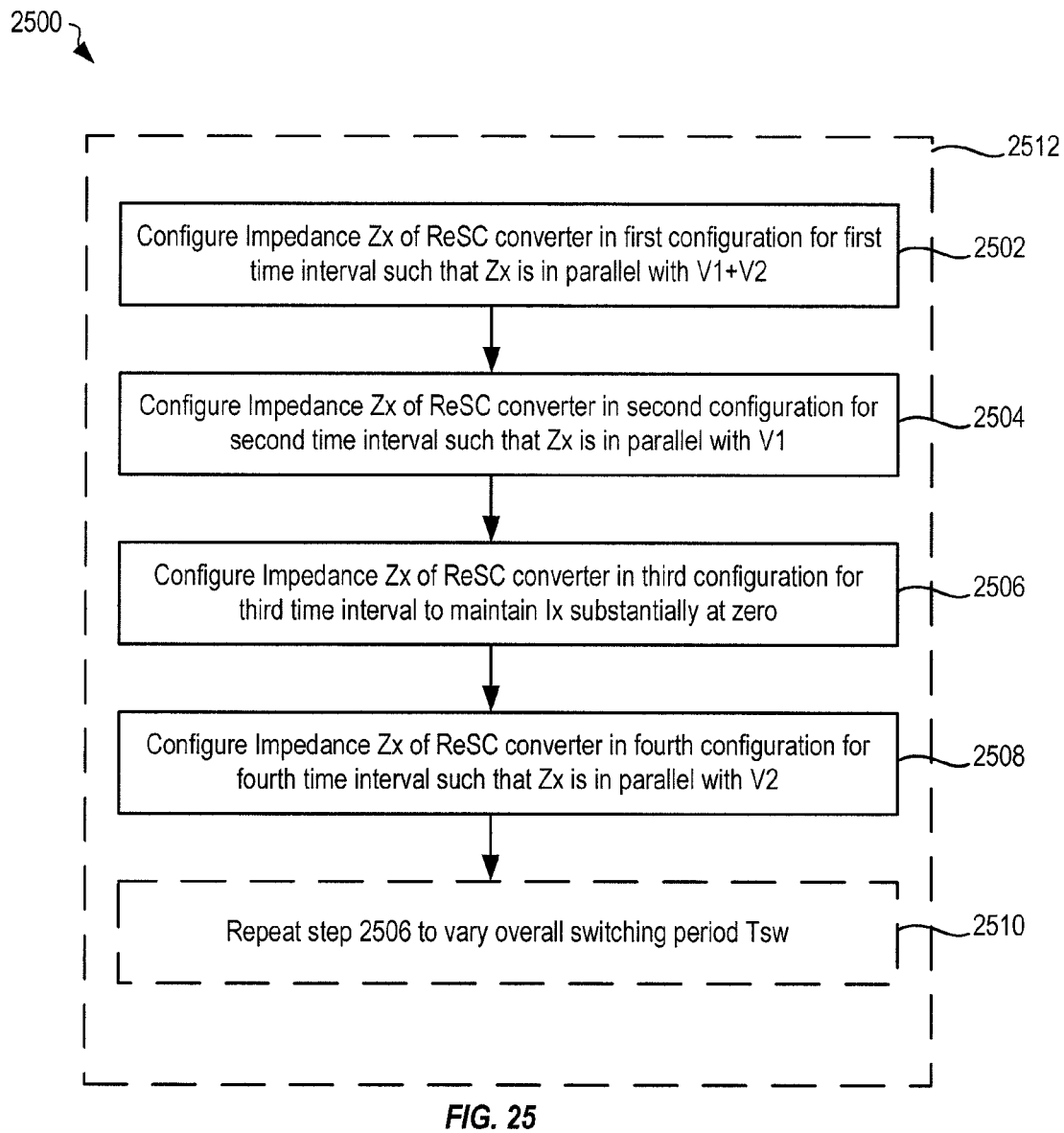
FIG. 25 depicts an exemplary flow chart illustrating a method for providing a ReSC, with energy sources or loads stacked in series, having variable conversion ratio, particularly for increasing the ratio between the energy sources or loads stacked in series, in another embodiment.

FIG. 25 depicts an exemplary flow chart illustrating a method 2500 for providing a ReSC, with energy sources or loads stacked in series, having variable conversion ratio, particularly for increasing the ratio between the energy sources or loads stacked in series, in another embodiment. For example, method 2500 is capable of increasing the ratio of V2/V1 of the ReSC converter 500, depicted in FIG. 5, including two energy elements E1 (502) and E2 (504), having voltages V1 and V2, respectively, and further including impedance Zx 508, and clock signals clk1-clk4 (510, 512, 514, 516, respectively) that drive a respective one of four switching devices (518, 520, 522, 524).

It should be appreciated that the above order of steps is not fixed, and that additional orders may be implemented. For example, step 2406 may be completed after step 2408.

In step 2502, the ReSC is configured such that the impedance Zx is in parallel with V1+V2, or ground referenced voltage VB, such that current flowing in Zx increases due to the voltage across Zx for a first time interval. In one example of operation of step 2502, Zx 508 is configured to be in parallel with series-connected energy elements E1 and E2 (502 and 504, respectively) such that Ix 1910 flowing through Zx 508 increases due to voltage V1+V2 across Zx 508. For example, clock signals clk1 and clk2 (510 and 512, respectively) may be set to "low" and clock signals clk3 and clk4 (514 and 516, respectively) may be set to "high" to configure Zx 508 in parallel with V1+V2. In other words, the switching devices are configured such that the first and fourth switching devices (518 and 524, respectively) are closed, and the second and third switching devices (520 and 522, respectively) are open.

In one embodiment, utilizing operation of the ReSC converter 500 in nominal conversion ratio including off-time modulation, the first time interval is zero. In other words, step 2502 is not implemented.

In step 2504, the ReSC is configured such that impedance Zx is in parallel with V1, for a second time interval. In one example of operation of step 2504, Zx 508 is configured to be in parallel with E1 502 for the second time interval equivalent to time interval T1 1906. For example, clock signals clk1-clk4 (510, 512, 514, and 516, respectively) are set to "high" such that Zx 508 is in parallel with E1 502 for time interval T1 1906. In other words, the switching devices are configured such that the second and fourth switching devices (520 and 524, respectively) are closed, and the first and third switching devices (518 and 522, respectively) are open.

In step 2506, the ReSC is configured such that the current Ix flowing through impedance Zx is maintained substantially at zero, for a third time interval. For example, Zx 508 may be configured to be disconnected from both of E1 502 and E2 504 for time interval TB 1904. In one example, clock signals clk1 and clk3 (510 and 514, respectively) are set to "high" and clock signals clk2 and clk3 (512 and 516, respectively) are set to "low" to configure Zx 508 such that Ix 1910 is maintained substantially at zero for time interval 1904. In other words, all switching devices are configured to be open.

In step 2508, the ReSC is configured such that impedance Zx is in parallel with V2 for a fourth time interval. In one example of operation of step 2508, Zx 508 is configured to be in parallel with E2 504 for time interval T2 1908 until the current Ix 1910 flowing through Zx 508 is substantially zero. For example, clock signals clk1-clk4 (510, 512, 514, and 516, respectively) may be set to "low" to configure Zx 508 in parallel with E2 504. In other words, the switching devices are configured such that the first and third switching devices (518 and 522, respectively) are closed, and the second and fourth switching devices (520 and 524, respectively) are open. In one embodiment, the fourth time interval is equivalent to substantially half of the resonant period of Zx.

Step 2510 is optional as indicated by the dashed outline. In step 2410, step 2506 is repeated to vary an overall switching period $T_{sw}$ (i.e. $T_{sw}$ 1901).

Steps 2502 through 2510 are repeated continuously, as indicated by dashed outline 2512 to provide ReSC having variable ratio between stacked series inputs or loads.

It should be appreciated that the above order of steps is not fixed, and that additional orders may be implemented. For example, step 2506 may be completed after step 2508.

In one embodiment, the current Ix flowing through the impedance Zx is substantially zero at the end of one or more of the second, third and fourth time intervals.

Features described above as well as those claimed below may be combined in various ways without departing from the scope hereof. The following examples illustrate some possible, non-limiting combinations:

(A1) A method for controlling a variable output of a resonant switched-mode converter including an input voltage ($V_{IN}$), an output voltage ($V_{OUT}$), a resonant impedance (Zx), and a first, second, third and fourth clock signal respectively driving a first, second, third and fourth switching devices may include steps of: (A) configuring the resonant impedance Zx in a first configuration such that a voltage across Zx is in parallel with $V_{IN}$ for a first time interval, (B) configuring the resonant impedance Zx in a second configuration such that the voltage across Zx is equivalent to $V_{IN}-V_{OUT}$ for a second time interval, and (C) configuring the resonant impedance Zx in a third configuration such that energy stored within Zx is transferred to $V_{OUT}$ for a third time interval.

(A2) In the method denoted as (A1), step (A) may include setting the first and fourth switching devices as closed and the second and third switching devices as open for the first time interval.

(A3) In either method denoted above as (A1) or (A2), step (B) may include setting the first and third switching devices as closed, and the second and fourth switching devices as open for the second time interval.

(A4) In any of the methods denoted above as (A1) through (A3), step (C) may include setting the second and fourth switching devices closed, and the first and third switching devices open for the third time interval.

(A5) In any of the methods denoted above as (A1) through (A4) may further include configuring first, second, third, and fourth switching devices as open for an off-time modulation period.

(A6) In any of the methods denoted above as (A1) through (A5) may further include repeating steps (A), (B) and (C).

(B1) A method for controlling a variable output of a resonant switched-mode converter including at least two energy sources or loads, E1 and E2 having voltage values V1 and V2, respectively, stacked in series, a resonant impedance Zx having a current Ix flowing therethrough, and a first, second, third, and fourth clock signal respectively driving a first, second, third, and fourth switching devices may include steps of: (A) configuring the resonant impedance Zx in a first configuration such that Zx is in parallel with V1 plus V2 for a first time interval, (B) configuring the resonant impedance Zx in a second configuration such that the resonant impedance Zx is in parallel with V2 for a second time interval, (C) configuring the resonant impedance Zx in a third configuration such that the current Ix flowing through resonant impedance Zx is maintained substantially at zero for a third time interval, and (D) configuring the resonant impedance Zx in a fourth configuration such that the resonant impedance Zx is in parallel with V1 for a fourth time interval.

(B2) In the method denoted as (B1), step (A) may include setting the first and fourth switching devices as closed and the second and third switching devices as open for the first time interval.

(B3) In either of the methods denoted above as (B1) or (B2), step (B) may include setting the first and third switching devices as closed and the second and fourth switching devices as open for the second time interval.

(B4) In any of the methods denoted above as (B1) through (B3), step (C) may include setting the first, second, third, and fourth switching devices as open for the third time interval.

(B5) In any of the methods denoted above as (B1) through (B4), step (D) may include setting the second and fourth switching devices as closed, and the first and third switching devices as open for the fourth time interval.

(B6) In any of the methods denoted above as (B1) through (B5), the steps may be performed in the order of (A), (B), (C), (D).

(B7) In any of the methods denoted above as (B1) through (B5), the steps may be performed in the order of (A), (B), (D), (C).

(B8) In any of the methods denoted above as (B1) through (B5), the steps may be performed in the order of (A), (D), (C), (B).

(B9) In any of the methods denoted above as (B1) through (B5), the steps may be performed in the order of (A), (D), (B), (C).

(B10) In any of the methods denoted above as (B1) through (B9), the fourth time interval may be substantially half of a resonant period of the resonant impedance Zx.

(B11) In any of the methods denoted above as (B1) through (B10), at least one of steps (A) through (D) may be repeated.

(B12) In any of the methods denoted above as (B1) through (B11), the method may further include varying the third time interval to vary an overall switching period $T_{sw}$.

(B13) In any of the methods denoted above as (B1) through (B12), the first time interval may be zero.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for controlling a variable output of a resonant switched-mode converter including an input voltage ($V_{IN}$), an output voltage ($V_{OUT}$), a resonant impedance (Zx), and a first, second, third and fourth clock signal respectively driving a first, second, third and fourth switching devices, the method comprising:
  (A) configuring the resonant impedance Zx in a first configuration such that a voltage across Zx is in parallel with $V_{IN}$ for a first time interval;
  (B) configuring the resonant impedance Zx in a second configuration such that the voltage across Zx is equivalent to $V_{IN}-V_{OUT}$ for a second time interval; and
  (C) configuring the resonant impedance Zx in a third configuration such that energy stored within Zx is transferred to $V_{OUT}$ for a third time interval.

2. The method of claim 1, wherein step (A) comprises setting the first and fourth switching devices as closed and the second and third switching devices as open for the first time interval.

3. The method of claim 2, wherein step (B) comprises setting the first and third switching devices as closed, and the second and fourth switching devices as open for the second time interval.

4. The method of claim 3, wherein step (C) comprises setting the second and fourth switching devices closed, and the first and third switching devices open for the third time interval.

5. The method of claim 1, further comprising configuring first, second, third, and fourth switching devices as open for an off-time modulation period.

6. The method of claim 1, further comprising repeating steps (A), (B) and (C).

7. A method for controlling a variable output of a resonant switched-mode converter including at least two energy sources or loads E1 and E2 having voltage values V1 and V2, respectively, stacked in series, a resonant impedance Zx having a current Ix flowing therethrough, and a first, second, third, and fourth clock signal respectively driving a first, second, third, and fourth switching devices, the method comprising:
- (A) configuring the resonant impedance Zx in a first configuration such that Zx is in parallel with V1 plus V2 for a first time interval;
- (B) configuring the resonant impedance Zx in a second configuration such that the resonant impedance Zx is in parallel with V2 for a second time interval;
- (C) configuring the resonant impedance Zx in a third configuration such that the current Ix flowing through resonant impedance Zx is maintained substantially at zero for a third time interval; and
- (D) configuring the resonant impedance Zx in a fourth configuration such that the resonant impedance Zx is in parallel with V1 for a fourth time interval.

8. The method of claim 7, wherein step (A) comprises setting the first and fourth switching devices as closed and the second and third switching devices as open for the first time interval.

9. The method of claim 8, wherein step (B) comprises setting the first and third switching devices as closed and the second and fourth switching devices as open for the second time interval.

10. The method of claim 9, wherein step (C) comprises setting the first, second, third, and fourth switching devices as open for the third time interval.

11. The method of claim 10, wherein step (D) comprises setting the second and fourth switching devices as closed, and the first and third switching devices as open for the fourth time interval.

12. The method of claim 11, wherein the steps are performed in the order of (A), (B), (C), (D).

13. The method of claim 12, wherein the fourth time interval is substantially half of a resonant period of the resonant impedance Zx.

14. The method of claim 11, wherein the steps are performed in the order of (A), (B), (D), (C).

15. The method of claim 11, wherein the steps are performed in the order of (A), (D), (C), (B).

16. The method of claim 11, wherein the steps are performed in the order of (A), (D), (B), (C).

17. The method of claim 15, wherein the fourth time interval is substantially half of a resonant period of the resonant impedance Zx.

18. The method of claim 8, wherein at least one of steps (A) through (D) is repeated.

19. The method of claim 8, further comprising varying the third time interval to vary an overall switching period $T_{sw}$.

20. The method of claim 11, wherein the first time interval is zero.

* * * * *